US012297660B1

(12) United States Patent
Yee et al.

(10) Patent No.: US 12,297,660 B1

(45) Date of Patent: May 13, 2025

(54) SYSTEMS, METHODS, AND DEVICES FOR ELECTRONIC DYNAMIC LOCK ASSEMBLY

(71) Applicant: APAD ACCESS, INC., New York, NY (US)

(72) Inventors: Steven S. Yee, New York, NY (US); Mark Benerofe, Atlanta, GA (US); Axel K. Paganakis, Brooklyn, NY (US); Erich G. Theophile, New York, NY (US); James R. Terrell, Charlotte, NC (US); Dustin L Morris, Plymouth, MN (US)

(73) Assignee: APAD ACCESS, INC., New York, NY (US)

( * ) Notice: Subject to any disclaimer, the term of this patent is extended or adjusted under 35 U.S.C. 154(b) by 0 days.

(21) Appl. No.: 18/498,025

(22) Filed: Oct. 30, 2023

Related U.S. Application Data

(62) Division of application No. 17/812,982, filed on Jul. 15, 2022, now Pat. No. 11,821,236.

(60) Provisional application No. 63/203,328, filed on Jul. 16, 2021.

(51) Int. Cl.
*E05B 47/00* (2006.01)

(52) U.S. Cl.
CPC .. *E05B 47/0002* (2013.01); *E05B 2047/0014* (2013.01); *E05B 2047/005* (2013.01); *E05B 2047/0088* (2013.01)

(58) Field of Classification Search
CPC ......... E05B 47/0002; E05B 2047/0014; E05B 2047/005; E05B 2047/0088
See application file for complete search history.

(56) References Cited

U.S. PATENT DOCUMENTS

| | | | |
|---|---|---|---|
| 4,979,383 A | | 12/1990 | Tully |
| 5,021,776 A | | 6/1991 | Anderson et al. |
| 5,857,365 A | | 1/1999 | Armstrong |
| 6,005,487 A | | 12/1999 | Hyatt, Jr. et al. |
| 6,023,224 A | * | 2/2000 | Meyvis .................. E05F 15/77 49/31 |
| 6,344,796 B1 | | 2/2002 | Ogilvie et al. |
| 6,404,337 B1 | | 6/2002 | Van Till et al. |
| 6,720,861 B1 | | 4/2004 | Rodenbeck et al. |
| 7,051,561 B2 | | 5/2006 | Moon et al. |
| 7,209,029 B2 | | 4/2007 | Coelho et al. |

(Continued)

FOREIGN PATENT DOCUMENTS

| | | |
|---|---|---|
| AU | 2005272239 A1 | 2/2006 |
| AU | 2012255665 B2 | 3/2013 |

(Continued)

*Primary Examiner* — Mark A Williams
(74) *Attorney, Agent, or Firm* — Perkins Coie LLP

(57) ABSTRACT

A lock management system manages access to a controlled environment by locking or unlocking a door. The lock management system can actuate one or more components of a lock system to lock or unlock the door. To determine whether to lock or unlock the door, the lock management system can establish a connection with one or more devices. The lock management system can receive an access credential via the connection and authenticate the access credential. Based on authenticating the access credential, the lock management system can lock or unlock the door. The lock management system can monitor a door status and/or door activity and provide alerts to a user computing device.

20 Claims, 18 Drawing Sheets

(56) References Cited

U.S. PATENT DOCUMENTS

| | | | | |
|---|---|---|---|---|
| 7,353,396 | B2 | 4/2008 | Micali et al. | |
| 7,374,084 | B2 | 5/2008 | Mitchell | |
| 7,525,411 | B2 | 4/2009 | Strader et al. | |
| 7,716,486 | B2 | 5/2010 | Libin et al. | |
| 7,758,428 | B2 | 7/2010 | Mattice et al. | |
| 7,822,989 | B2 | 10/2010 | Libin et al. | |
| 8,035,478 | B2 | 10/2011 | Lee | |
| 8,261,319 | B2 | 9/2012 | Libin et al. | |
| 8,264,322 | B2 | 9/2012 | Rodenbeck et al. | |
| 8,593,250 | B2 | 11/2013 | Sehora | |
| 8,643,469 | B2 | 2/2014 | Häberli | |
| 8,665,064 | B1 | 3/2014 | Rodenbeck et al. | |
| 8,730,004 | B2 | 5/2014 | Elfström et al. | |
| 8,881,252 | B2 | 11/2014 | Van Till et al. | |
| 8,973,417 | B2 | 3/2015 | Bench et al. | |
| 8,990,889 | B2 | 3/2015 | Van Till et al. | |
| 9,024,759 | B2 | 5/2015 | Uyeda et al. | |
| 9,051,761 | B2 | 6/2015 | Romero | |
| 9,163,446 | B2 | 10/2015 | Houser et al. | |
| 9,222,280 | B2 | 12/2015 | Mackle | |
| 9,260,887 | B2 | 2/2016 | Lambrou et al. | |
| 9,328,532 | B2 | 5/2016 | Nguyen et al. | |
| 9,334,676 | B2 | 5/2016 | Lambrou et al. | |
| 9,340,999 | B2 | 5/2016 | Romero | |
| 9,390,572 | B2 * | 7/2016 | Almomani ......... | G07C 9/00309 |
| 9,406,181 | B2 * | 8/2016 | Almomani ......... | G07C 9/00817 |
| 9,424,700 | B2 | 8/2016 | Lovett et al. | |
| 9,437,063 | B2 | 9/2016 | Schoenfelder et al. | |
| 9,500,007 | B2 | 11/2016 | Lambrou et al. | |
| 9,512,644 | B2 | 12/2016 | Lambrou et al. | |
| 9,512,654 | B2 | 12/2016 | Armari et al. | |
| 9,551,174 | B2 | 1/2017 | Bartos et al. | |
| 9,644,401 | B2 | 5/2017 | Nguyen et al. | |
| 9,652,913 | B2 | 5/2017 | Drako et al. | |
| 9,666,000 | B1 | 5/2017 | Schoenfelder et al. | |
| 9,670,696 | B2 * | 6/2017 | Chong ............... | G07C 9/00174 |
| 9,691,207 | B2 | 6/2017 | Almomani | |
| 9,697,302 | B2 | 7/2017 | Nguyen et al. | |
| 9,710,981 | B2 | 7/2017 | Wolski | |
| 9,747,735 | B1 | 8/2017 | Drako et al. | |
| 9,758,991 | B2 | 9/2017 | Lin et al. | |
| 9,767,630 | B1 | 9/2017 | Kazerani et al. | |
| 9,792,747 | B2 | 10/2017 | Baumgarte et al. | |
| 9,922,480 | B2 | 3/2018 | Mills et al. | |
| 9,926,723 | B2 | 3/2018 | Mackle | |
| 9,963,921 | B1 | 5/2018 | Kamkar et al. | |
| 10,008,054 | B2 | 6/2018 | Eyring et al. | |
| 10,033,972 | B2 * | 7/2018 | Almomani ......... | G07C 9/00182 |
| 10,083,559 | B2 | 9/2018 | Schoenfelder et al. | |
| 10,083,560 | B2 | 9/2018 | Baumgarte et al. | |
| 10,089,810 | B1 | 10/2018 | Kaye et al. | |
| 10,122,138 | B2 | 11/2018 | Uyeda | |
| 10,163,285 | B2 | 12/2018 | Schoenfelder et al. | |
| 10,176,687 | B2 * | 1/2019 | Almomani ........... | G08B 21/182 |
| D839,761 | S | 2/2019 | Schoenfelder et al. | |
| 10,235,821 | B1 | 3/2019 | Drako et al. | |
| 10,240,365 | B2 | 3/2019 | Almomani et al. | |
| 10,248,898 | B2 | 4/2019 | Brown | |
| 10,257,708 | B1 | 4/2019 | Kamkar et al. | |
| 10,274,909 | B2 | 4/2019 | Lyman | |
| 10,304,269 | B2 | 5/2019 | Kazerani et al. | |
| 10,309,125 | B2 | 6/2019 | Beck | |
| 10,311,664 | B2 | 6/2019 | Baumgarte et al. | |
| 10,366,551 | B2 | 7/2019 | Drako et al. | |
| 10,378,238 | B2 | 8/2019 | Beck et al. | |
| 10,385,589 | B2 | 8/2019 | Matosian | |
| 10,403,063 | B2 | 9/2019 | Drako et al. | |
| 10,445,956 | B2 | 10/2019 | Kamkar et al. | |
| 10,452,381 | B2 | 10/2019 | Khakpour et al. | |
| 10,490,000 | B2 | 11/2019 | Schoenfelder et al. | |
| 10,498,399 | B1 | 12/2019 | Kamkar et al. | |
| 10,515,495 | B2 | 12/2019 | Schoenfelder et al. | |
| 10,519,694 | B2 | 12/2019 | Lin et al. | |
| 10,599,826 | B2 | 3/2020 | Kazerani et al. | |
| 10,655,363 | B2 * | 5/2020 | Piantek ................. | E05B 47/026 |
| 10,666,799 | B2 | 5/2020 | Kazerani et al. | |
| 10,666,912 | B2 | 5/2020 | Almomani et al. | |
| 10,674,365 | B1 | 6/2020 | Kamkar et al. | |
| 10,676,963 | B2 | 6/2020 | Vasudevan et al. | |
| 10,679,111 | B2 | 6/2020 | Brown | |
| 10,704,293 | B2 | 7/2020 | Almomani et al. | |
| 10,731,380 | B2 | 8/2020 | Beck | |
| 10,738,504 | B2 | 8/2020 | Uyeda et al. | |
| 10,755,501 | B2 | 8/2020 | Kaye et al. | |
| 10,769,877 | B2 | 9/2020 | Kaye et al. | |
| 10,783,731 | B2 | 9/2020 | Imanuel | |
| 10,810,307 | B2 | 10/2020 | Brown et al. | |
| 10,822,833 | B2 | 11/2020 | Mackle | |
| 10,866,799 | B2 | 12/2020 | Coolidge | |
| 10,872,483 | B2 | 12/2020 | Schoenfelder et al. | |
| 10,885,734 | B2 | 1/2021 | Schoenfelder et al. | |
| 10,890,015 | B2 | 1/2021 | Pavlovic et al. | |
| 10,896,564 | B2 | 1/2021 | Kazerani et al. | |
| 10,901,379 | B2 | 1/2021 | Bunker et al. | |
| 10,909,792 | B2 | 2/2021 | Schoenfelder et al. | |
| 10,930,097 | B2 | 2/2021 | Brown | |
| 11,099,533 | B2 | 8/2021 | Warren et al. | |
| 11,151,816 | B2 | 10/2021 | Schoenfelder et al. | |
| 11,282,314 | B2 | 3/2022 | Schoenfelder et al. | |
| 2005/0174214 | A1 | 8/2005 | Ocana | |
| 2005/0284200 | A1 | 12/2005 | Moon et al. | |
| 2006/0000247 | A1 | 1/2006 | Moon et al. | |
| 2006/0001522 | A1 | 1/2006 | Moon et al. | |
| 2007/0137267 | A1 | 6/2007 | Pilatowicz et al. | |
| 2011/0140838 | A1 | 6/2011 | Ocaña | |
| 2013/0219975 | A1 * | 8/2013 | Ainley ................... | G08C 17/02 70/279.1 |
| 2014/0113563 | A1 | 4/2014 | Almomani et al. | |
| 2014/0245798 | A1 * | 9/2014 | Beckman .............. | E05B 13/002 70/14 |
| 2015/0027178 | A1 * | 1/2015 | Scalisi .................. | E05B 47/026 292/144 |
| 2015/0098630 | A1 | 4/2015 | Perna et al. | |
| 2015/0102609 | A1 | 4/2015 | Johnson et al. | |
| 2015/0322694 | A1 | 11/2015 | Carr et al. | |
| 2015/0332528 | A1 | 11/2015 | MiGinnis et al. | |
| 2017/0051533 | A1 | 2/2017 | Kester et al. | |
| 2017/0098335 | A1 | 4/2017 | Payack, Jr. | |
| 2018/0089916 | A1 | 3/2018 | Drako et al. | |
| 2018/0171667 | A1 | 6/2018 | Martin et al. | |
| 2018/0183835 | A1 | 6/2018 | Bryant et al. | |
| 2018/0340354 | A1 | 11/2018 | Beck | |
| 2019/0073843 | A1 | 3/2019 | Bryant | |
| 2019/0100940 | A1 | 4/2019 | Imanuel et al. | |
| 2019/0122461 | A1 | 4/2019 | Drako et al. | |
| 2019/0156604 | A1 | 5/2019 | Drako et al. | |
| 2019/0213813 | A1 * | 7/2019 | Chong .................. | E05B 47/026 |
| 2019/0284839 | A1 | 9/2019 | Almomani et al. | |
| 2019/0295343 | A1 | 9/2019 | Bryant et al. | |
| 2019/0297089 | A1 | 9/2019 | Bryant | |
| 2019/0301227 | A1 | 10/2019 | Soderqvist | |
| 2019/0325673 | A1 | 10/2019 | Bardack et al. | |
| 2019/0327098 | A1 * | 10/2019 | Hart ........................ | E05B 45/06 |
| 2019/0368228 | A1 * | 12/2019 | Lin ......................... | E05B 45/06 |
| 2020/0013021 | A1 | 1/2020 | Dreyer | |
| 2020/0051353 | A1 | 2/2020 | Schoenfelder et al. | |
| 2020/0074776 | A1 | 3/2020 | Uyeda | |
| 2020/0080343 | A1 | 3/2020 | Uyeda et al. | |
| 2020/0098216 | A1 | 3/2020 | Kuster et al. | |
| 2020/0105078 | A1 | 4/2020 | Nguyen et al. | |
| 2020/0123838 | A1 | 4/2020 | Dreyer | |
| 2020/0159387 | A1 | 5/2020 | Schoenfelder et al. | |
| 2020/0219345 | A1 | 7/2020 | Beck | |
| 2020/0327757 | A1 | 10/2020 | Kelley et al. | |
| 2020/0378172 | A1 | 12/2020 | Lerpard | |
| 2020/0389628 | A1 | 12/2020 | Almomani et al. | |
| 2020/0394862 | A1 | 12/2020 | Kaye et al. | |
| 2020/0402335 | A1 | 12/2020 | Schoenfelder et al. | |
| 2020/0410832 | A1 | 12/2020 | Szczygiel et al. | |
| 2021/0010293 | A1 | 1/2021 | Almomani et al. | |
| 2021/0021635 | A1 | 1/2021 | Jones et al. | |
| 2021/0040773 | A1 | 2/2021 | Uyeda et al. | |
| 2021/0049845 | A1 | 2/2021 | Schoenfelder et al. | |
| 2021/0049851 | A1 | 2/2021 | Schoenfelder et al. | |

(56) References Cited

U.S. PATENT DOCUMENTS

| | | | |
|---|---|---|---|
| 2021/0071462 | A1 | 3/2021 | Soderqvist |
| 2021/0074105 | A1 | 3/2021 | Imanuel |
| 2021/0142601 | A1 | 5/2021 | Schoenfelder et al. |
| 2021/0225100 | A1 | 7/2021 | Jones et al. |
| 2021/0304535 | A1 | 9/2021 | Studerus |
| 2021/0336963 | A1 | 10/2021 | Rovito et al. |
| 2021/0407229 | A1 | 12/2021 | Schoenfelder et al. |
| 2022/0020234 | A1 | 1/2022 | Schoenfelder et al. |
| 2022/0042349 | A1 | 2/2022 | Barnett et al. |
| 2022/0056735 | A1 | 2/2022 | Hsu et al. |
| 2022/0068059 | A1 | 3/2022 | Nguyen et al. |

FOREIGN PATENT DOCUMENTS

| | | | |
|---|---|---|---|
| AU | 2004240257 | C1 | 12/2013 |
| AU | 2017324945 | A1 | 3/2019 |
| CA | 2868612 | C | 6/2022 |
| CN | 103797519 | A | 5/2014 |
| CN | 205486369 | U | 8/2016 |
| CN | 111512009 | A | 8/2020 |
| DE | 102012100923 | A1 | 8/2013 |
| DK | 2921621 | T3 | 4/2018 |
| EP | 1562153 | A2 | 8/2005 |
| EP | 1647917 | A2 | 4/2006 |
| EP | 2323106 | B1 | 9/2018 |
| EP | 3510566 | A1 | 7/2019 |
| EP | 3198095 | B1 | 9/2019 |
| ES | 2895548 | T3 | 2/2022 |
| WO | WO 2021/113816 | A1 | 6/2021 |

* cited by examiner

SYSTEMS, METHODS, AND DEVICES FOR ELECTRONIC DYNAMIC LOCK ASSEMBLY

BACKGROUND

Field

The embodiments of the disclosure generally relate to access control assemblies, and more particularly to systems, methods, and devices for electronic dynamic lock assemblies.

BRIEF DESCRIPTION OF THE DRAWINGS

The drawings are provided to illustrate example embodiments and are not intended to limit the scope of the disclosure. A better understanding of the systems and methods described herein will be appreciated upon reference to the following description in conjunction with the accompanying drawings, wherein.

DETAILED DESCRIPTION

Figure 1:
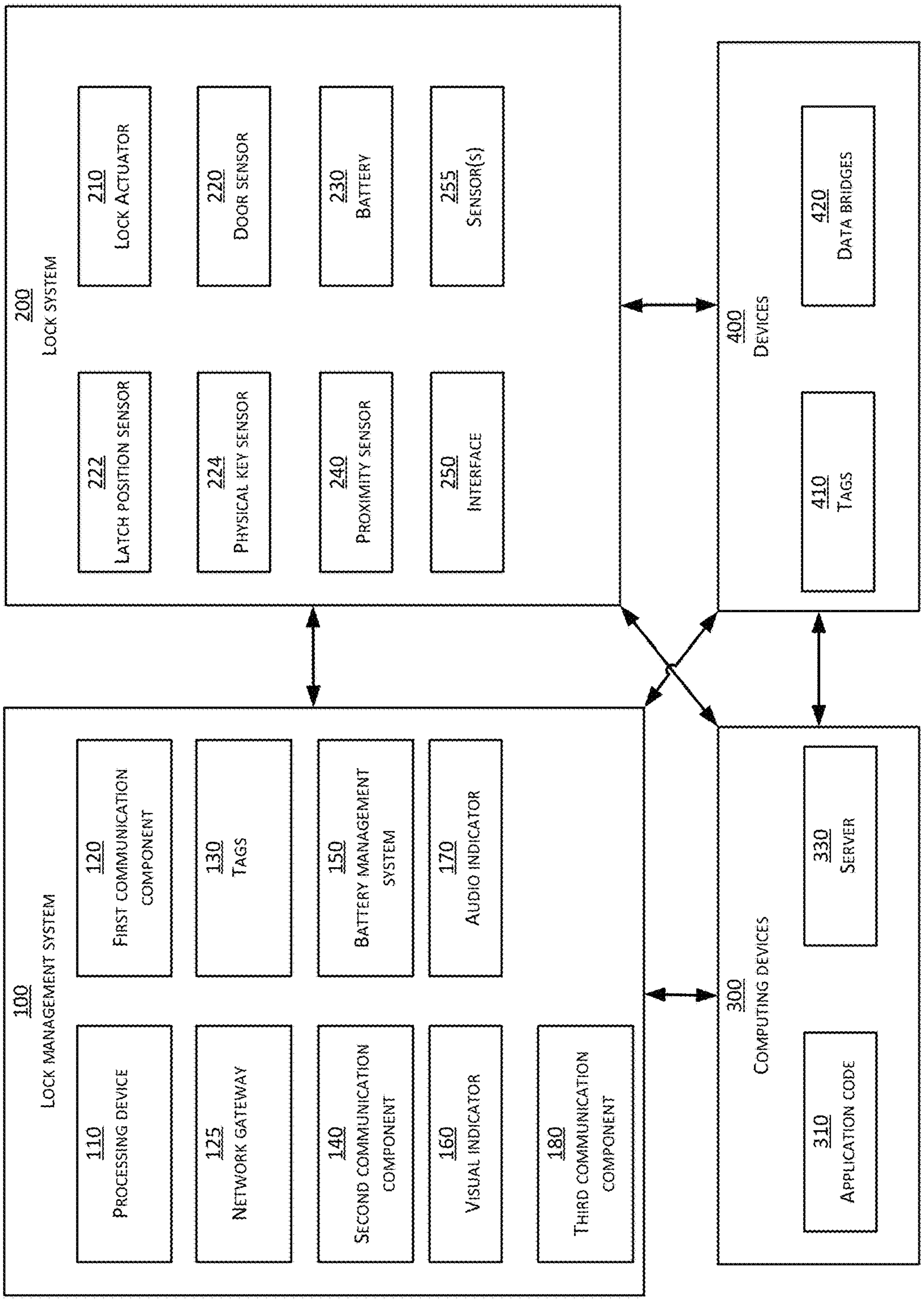
FIG. 1 depicts a schematic diagram of a system including a lock management system according to some embodiments herein.

Embodiments are described herein according to the following outline:

1.0. General Overview
2.0 System Overview
  2.1 Computing Systems and Computing Devices
    2.1.1 Computing Devices
    2.1.2 Lock Systems
    2.1.3 Devices
  2.2 Network
  2.3 Interface
3.0. Alert Generation Based On Lock Actuation
4.0 Remote Unlock
5.0 User Authentication
6.0 Unlock Sequence
7.0 Smart Lock Remote Unlock Without Computing Device
8.0 Local Door Open And Close Sequences
9.0 Walk-Up Unlock Embodiments
10.0 Lock Assembly Embodiments
11.0 Business Intelligence Data
12.0 Two-Way Communication Platform
13.0 Leasing Activities
14.0 Maintenance
15.0 Initialization of Components for Lock Actuation
16.0 Computing System

1.0 General Overview

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Some embodiments herein are directed to an improved system for managing access to a controlled environment using a lock system. A lock management system can grant or restrict access to physical spaces by locking or unlocking a door or a multitude of doors utilizing a lock system associated with the door. It will be understood that the lock management system may be referred to herein as a smart lock system, a smart lock management system, etc. In some embodiments, the lock management system and the lock system may be part of the same system (e.g., may be components or sub-systems of the same system). Further, the lock management system may include one or more subsystems. For example, the lock management system may include a lock mechanism, one or more integrated sensors, one or more lock electronics, one or more printed circuit boards, external software, and/or external hardware.

The lock management system may provide users, via user computing devices, with one or more credentials. All or a portion of the credentials can be used to lock and/or unlock a door that they are permissioned to open. In some embodiments, all or a portion of the credentials are sent to an access control device of the lock management system from a user computing device or from a cloud server. In some embodiments, user computing devices can send credentials to other computing devices to provide permission for a guest and/or other user associated with the other computing devices to access specific doors for a specific period of time.

The lock management system can record door activity. For example, the lock management system can record one or more statuses of the lock and/or a log of door activity. Based on the recorded door activity, the lock management system can generate alerts and provide the alerts to user computing devices. The lock management system can store the alerts and/or associated information in a database for future business intelligence reporting for residents, occupants, homeowners, building managers and owners. For example, the lock management system can generate a report based on the alerts and/or the door activity and provide the report to a user computing device.

In some embodiments, a lock system may be connected to virtual compute resources (e.g., the cloud). The virtual compute resource may enable a user computing device to operate a lock system remotely (e.g., the user computing device and the lock system are not connected to the same network) by providing lock and/or lock commands via the virtual compute resources and to remotely receive reporting and alerts.

In some embodiments, the lock management system can enable the operation of a lock system using a near field communication ("NFC") card, fob, and/or computing device. For example, the lock management system may use a proximity sensor to power on a NFC card reader (e.g., an NFC card reader that consumes more power as compared to other components of the lock system and/or the lock management system) when a user is detected using the proximity sensor to reduce power consumption (e.g., on a battery-powered lock system).

Typically, traditional systems may be unable to enable the operation of a lock system remotely. Further, such traditional systems may be unable to selectively initialize components of the lock system and/or the lock management system based on received data communications. Instead, existing systems may initialize each component of the lock system and/or the lock management system and, based on the data communications, utilize a particular component. Further, the existing systems may not initializing operation of the lock system based on low-power data communications by a user computing device. Instead, the existing systems may require active communication to initialize operation of the lock system. For example, existing systems may not initialize operation of the lock system until an active communication is received. Instead, a user computing device may actively transmit an unlock door request and the existing systems may initiate the operation of the lock system based on the unlock door request. Therefore, the operation of the lock system by the existing systems may be extensive and/or inefficient.

Further, manual operation of a lock system can be inefficient and time consuming. For example, where a user has multiple keys, it may be inefficient and time consuming to identify the correct key for a particular lock system from a plurality of keys and manually operate a lock system. Traditional computing systems may be limited to operating a lock system when the system and the lock system are connected to the same network. Further, traditional computing systems may be limited to receiving unlock and/or lock commands from a device and providing the commands to a lock system that cause the lock system to perform an operation. For example, traditional computing systems may not initialize components based on detecting a presence of a user. Instead, each of the components of the computing system may be pre-initialized and may or may not be operated in response to a given command. This can introduce a delay in the implementation and/or execution of lock operations and can increase power consumption. As some actions may be time-sensitive, it may be disadvantageous to delay the implementation of operations. Additionally, as some systems may have a limited battery life, it may be disadvantageous to increase power consumption. Further, the use of such a traditional computing system can increase memory demands and processing usage.

The disclosed lock management system addresses these challenges, among others, by (1) actively scanning for data communications, (2) identifying components for initialization based on data communications, (3) providing alerts via one or more components of the lock system and/or the lock management system, (4) enabling a low power mode of a lock system and/or a lock management system, and (5) enabling remote lock and/or unlock operations. This process may not be capable of being performed mentally as the human mind may not be equipped to scan for data communications, initialize hardware components, and/or actuate a component of a lock system.

2.0 System Overview

FIG. 1 depicts a schematic diagram of a system including a lock management system 100, a lock system 200, computing device(s) 300, and device(s) 400 according to some embodiments herein. In the illustrated embodiment, the lock management system 100 includes a processing device 110, a first communication component 120, a network gateway 125, tag(s) 130, a second communication component 140, a battery management system 150, a visual indicator 160, an audio indicator 170, and a third communication component 180. The lock system 200 includes a lock actuator 210, a door sensor 220, a latch position sensor 222, a physical key sensor 224, a battery 230, a proximity sensor 240, an interface 250, and sensor(s) 255. The computing device(s) 300 include an application code 310 and a server 330. The devices 400 include tag(s) 410 and data bridges 420. Any one or any combination of the components shown and described in FIG. 1 can each be implemented using one or more computing devices, such as, but not limited to one or more servers, processors, computing devices, virtual machines, etc., and communicate via a network for operation of the lock system 200. The network can be a local area network (LAN) or a wide area network (WAN), such as the Internet.

2.1 Computing Systems and Computing Devices

The lock management system 100, the lock system 200, the computing device(s) 300, and the device(s) 400 may include one or more computing systems or computing devices. For example, the lock management system 100, the lock system 200, the computing device(s) 300, and the device(s) 400 may include any network-equipped computing device, for example desktop computers, laptops, smartphones, tablets, and the like.

2.1.1 Computing Devices

The computing device(s) 300 may include one or more computing devices associated with a user. The user may utilize the one or more computing device(s) 300 to obtain alerts associated with the lock system 200 and/or provide lock operations.

The computing device(s) may execute the application code 310. The application code 310 may cause an application to be implemented. The application may be any computer application that is executable by a computing device, such as a microprocessor. For example, the application may be a website, a computer program, a computing device application, virtual reality application, an augmented reality application, a mobile device application, a motion graphics application, a heads-up representations, a gaming application, video or audio data, all or a portion of an operating system, virtual machine, container, pod, etc. In certain cases, such as where the application is a computer application, the application may include source code or object code that when executed implements the computer program, operating system, or the like.

The computing device(s) may further include and/or be in communication with a server 330. The computing device(s) may store and/or access data associated with the lock at the server 300.

2.1.2 Lock Systems

The lock management system 100 and the lock system 200 may include one or more computing systems associated with a lock. In some embodiments, lock management system 100 and the lock system 200 may be separate systems. In other embodiments, the lock management system 100 and the lock system 200 may be part of the same system.

The processing device 110 may be a microprocessor or any other hardware processor. Further, the processing device 110 may be associated with an operating system and/or firmware for execution of a lock management process.

The first communication component 120 may be a personal network communication component enabling personal network communications. For example, the first communication component 120 may be a Bluetooth component that enables Bluetooth communications.

The network gateway 125 may be a gateway for connecting, via a network to a peripheral component. For example, the network gateway 125 may be a component which provides a request for a connection to a device advertising a network connection (e.g., a Bluetooth connection).

The tag(s) 130 may be communication tag(s) identifying the lock management system 100. For example, the tag(s) 130 may be NFC tags, NFC cards, NFC fobs, etc.

The second communication component 140 may be a wide area network communication component enabling wide area network communications. For example, the second communication component 140 may be a wide area network radio.

The battery management system 150 may be a power and/or battery management system (e.g., a power management integrated circuit ("PMIC")).

The visual indicator 160 may be an indicator for outputting image data (e.g., a display, a light, etc.). The audio indicator 170 may be an indicator for outputting audio data (e.g., a speaker). In some embodiments, the lock management system 100 may include one or more other indicators.

The third communication component 180 may be a network communication component enabling network communications. For example, the third communication component 180 may be an NFC reader (e.g., a computing device) that reads communications from NFC devices. In some embodiments, one or more of the first communication component 120, the second communication component 140, and/or the third communication component 180 may be the same communication component.

The lock system 200 includes a lock actuator 210, a door sensor 220, a latch position sensor 222, a physical key sensor 224, a battery 230, a proximity sensor 240, and an interface 250.

The lock actuator 210 may include an actuator to operate a lock (e.g., a general purpose input/output ("GPIO") lock actuator).

The door sensor 220 may be any sensor to detect the position of a door associated with the lock. For example, the door sensor 220 may be a proximity sensor, a light sensor, a contact sensor, a position sensor, or any other sensor. In some embodiments, the lock system 200 may include a plurality of door sensors or other sensors.

The latch position sensor 222 may be any sensor for detecting the position of a latch associated with the lock. For example, the latch position sensor 222 may be a proximity sensor, a light sensor, a contact sensor, a position sensor, or any other sensor.

The physical key sensor 224 may be any sensor for detecting the presence of a physical key and/or position of a physical key. For example, the physical key sensor 224 may be a magnetic switch, a proximity sensor, a light sensor, a contact sensor, a position sensor, or any other sensor.

The battery 230 may include a power source for the lock and/or the latch.

The proximity sensor 240 may be any sensor for detecting the presence of a user (e.g., a user physically approaching a lock). For example, the proximity sensor 240 may be a proximity sensor, a light sensor, a contact sensor, a position sensor, or any other sensor. In some embodiments, one or more of the door sensor 220, the latch position sensor 222, the physical key sensor, and/or the proximity sensor 240 may be the same hardware sensor or different hardware sensors.

The interface 250 may be any user interface for receiving input. For example, the interface 250 may include a touchscreen, a keypad, a keyboard, a display, a microphone, a camera, etc.

The sensor(s) 255 may include any sensors. For example, the sensor(s) 255 may include one or more of a proximity sensor, a light sensor, a contact sensor, a position sensor, or any other sensor. One or more of the sensor(s) 255 can provide sensor data that can be used to detect the state of a lock, detect use of the lock, detect a type of lock use, detect a presence of users, detect actions of a user, record environmental characteristics, and/or record or detect any data.

2.1.3 Devices

The device(s) 400 may include one or more computing devices. For example, the device(s) 400 may include a NFC card, an NFC card reader, a user computing device, or any other computing device. The tags 410 may be communication tag(s) identifying the device(s) 400. For example, the tag(s) 130 may be NFC tags, NFC cards, NFC fobs, etc. The data bridges 420 may be bridges for communication between a first network (e.g., a personal network) to a second network (e.g., a local network, the Internet, etc.)

2.2 Network

The lock management system 100, the lock system 200, the computing device(s) 300, and the device(s) 400 may communicate over the network. The network can include any appropriate network, including an intranet, the Internet, a cellular network, a local area network or any other such network or combination thereof. In the illustrated embodiment, the network is the Internet. Protocols and components for communicating via the Internet or any of the other aforementioned types of communication networks are known to those skilled in the art of computer communications and thus, need not be described in more detail herein. In some embodiments, one or more of the lock management system 100, the lock system 200, the computing device(s) 300, and the device(s) 400 may communicate via different networks.

2.3 Interface

The computing device(s) 300 may communicate with an interface (e.g., cause an interface to be displayed). The interface can be an application programming interface ("API"). The lock management system 100 and/or the lock system 200 may communicate with the interface to enable (e.g., cause) display of data identifying a current state, historical state, etc. of the lock) and/or data identifying historical entries, a current entry, etc. to the lock). In some embodiments, the lock management system 100 and/or the lock system 200 may provide a uniform resource identifier ("URI") (e.g., a uniform resource locator ("URL")) that enables the computing device(s) 300 to access the data.

2.4 Example Embodiment

Figure 8:
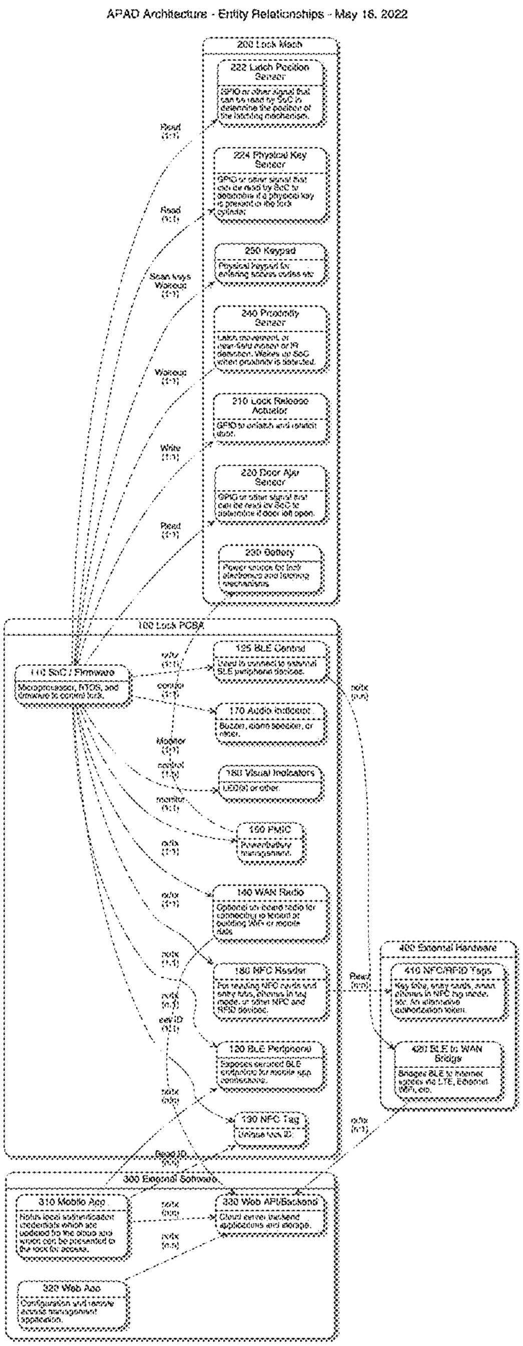
FIG. 8 depicts a schematic diagram of a system including a lock management system according to some embodiments herein.

FIG. 8 illustrates a particular embodiment of the system illustrated in FIG. 1. In the example of FIG. 8, the system of FIG. 8 comprises the lock management system 100, which is a smart lock electronics subsystem (e.g., the lock management system) comprising one or more printed circuit board assemblies ("PCBAs") containing the smart lock electronics.

In some embodiments, the system comprises element 110, which may include a System-on-a-Chip ('SoC") and firmware that manage the in-door smart lock components.

In some embodiments, the system comprises element 120, which may include a Bluetooth Low Energy radio that exposes the smart lock as a Bluetooth Low Energy ("BLE") peripheral device which can advertise its presence and be connected to by external BLE central devices.

In some embodiments, the system comprises element 150, which may include a power management control integrated circuit ("IC") for managing lock power usage.

In some embodiments, the system comprises element 130, which may include an NFC tag device or computing device that can contain unique identifiers and other information for each installed smart lock.

In some embodiments, the system comprises element 180, which may include an NFC tag reader which can be used to scan NFC tags in external key cards, access fobs, mobile devices, computing devices, or other NFC and RFID devices etc.

In some embodiments, the system comprises element 125, which may include a BLE radio that exposes the smart lock as a BLE central device, which can also connect to and communicate with BLE peripheral devices.

In some embodiments, the system comprises element 160, which may include one or more LEDs or other visual indicators.

In some embodiments, the system comprises element 170, which may include one or more buzzers, alarm speakers, or other audio indicators.

In some embodiments, the system comprises element 140, which may include a longer-range radio used to connect to a WAN network or the Internet. In some embodiments, the element 140 is a WiFi radio which can connect through a building-installed WiFi network. Alternatively the system comprises a radio which can connect via a Long Term Evolution ("LTE") data device or similar mobile data device such that the system can connect directly to a public mobile network infrastructure.

In some embodiments, the system comprises element 171, which may include an ultra-wideband "UWB") radio.

In some embodiments, the system comprises element 172, which may include directional Bluetooth antennas that enable the system to determine the location of a device connected through a BLE connection.

In some embodiments, the system comprises element 173, which may include directional UWB antennas.

In some embodiments, the system comprises element 174, which may include an RF switch.

In some embodiments, the system comprises the lock system 200, which may include a subsystem comprising electronics and physical devices attached to the door.

In some embodiments, the system comprises element 210, which may include a lock release actuator which can be electronically controlled to enable or disable the lock release mechanisms to allow or disallow the door to be opened.

In some embodiments, the system comprises element 211, which may include a latch release actuator which can be electronically controlled to open the latch on the door to allow easier entry.

In some embodiments, the system comprises element 220, which may include a door ajar sensor which can be electronically read to determine if the door has been left open.

In some embodiments, the system comprises element 222, which may include a latch position sensor which can be electronically read to determine the position of the latching mechanism.

In some embodiments, the system comprises element 224, which may include a physical key sensor which can be electronically read to determine if a physical key is present in the lock cylinder.

In some embodiments, the system comprises element 230, which may include a battery which powers the lock and its electronics.

In some embodiments, the system comprises element 240, which may include a proximity sensor that can wake up the lock SoC whenever a user is sensed near the lock.

In some embodiments, the system comprises element 250, which may include a physical keypad which can be used as an input mechanism to enter access codes, pin codes, or other forms of numeric or alphanumeric inputs which may include special characters.

In some embodiments, the system comprises element 410, which may include an external NFC or RFID tags. For example, the element 410 may include an entry card, fob, or computing devices in NFC tag mode.

In some embodiments, the system comprises element 420, which may include a BLE to WAN bridge. The element 420 may offer an additional path of egress for the lock to access the WAN/Internet networks.

In some embodiments, the system comprises computing devices 300, which may include a subsystem comprising software applications executing on computing devices or cloud networks.

In some embodiments, the system comprises element 310, which may include an application (e.g., a mobile application) that communicates with the cloud backend as well as with the lock over BLE.

In some embodiments, the system comprises element 320, which may include a web application that communicates with the cloud backend.

In some embodiments, the system comprises element 330, which may include a cloud backend server application and associated data stores.

In some embodiments, the system can enable a smart lock to be opened using an NFC tag in an access card, fob, or other object, which can be presented at any time.

In some embodiments, the smart lock may be battery powered. In some embodiments, the NFC tag reader uses more electrical power as compared to other components of the system, and therefore, the NFC tag reader may be powered off until a user approaches the system and/or until the user presents an access card or other computing device with NFC capabilities.

In some embodiments, the system comprises a proximity detection sensor (e.g., that uses less power as compared to the NFC tag reader) that can be left on to continuously determine the presence of a user, at which point the system can enable the NFC tag reader to read the access card, if one is present near the system. In some embodiments, powering off the NFC tag reader until a user approaches the system as detected by a proximity sensor results in power savings of 40%, 45%, 50%, 55%, 60%, 65%, 70%, 75%, 80%, 85%, 90%, 95% or the like.

In some embodiments, the system is configured such that a smart lock can be opened by using a computing device, which communicates over BLE and/or which reads an NFC tag in the smart lock.

In some embodiments, these communications over BLE or through an NFC tag can be used to further avoid powering on the NFC reader when proximity is detected.

3.0 Alert Generation Based on Lock Actuation

The lock management system and/or the lock system may facilitate the operations to actuate a lock. Based on the operations being performed, the lock management system and/or the lock system can provide alerts (e.g., to an indicator, a user computing device, etc. The lock management system and/or the lock system can further monitor activity and/or a status associated with a door.

Figure 2A:
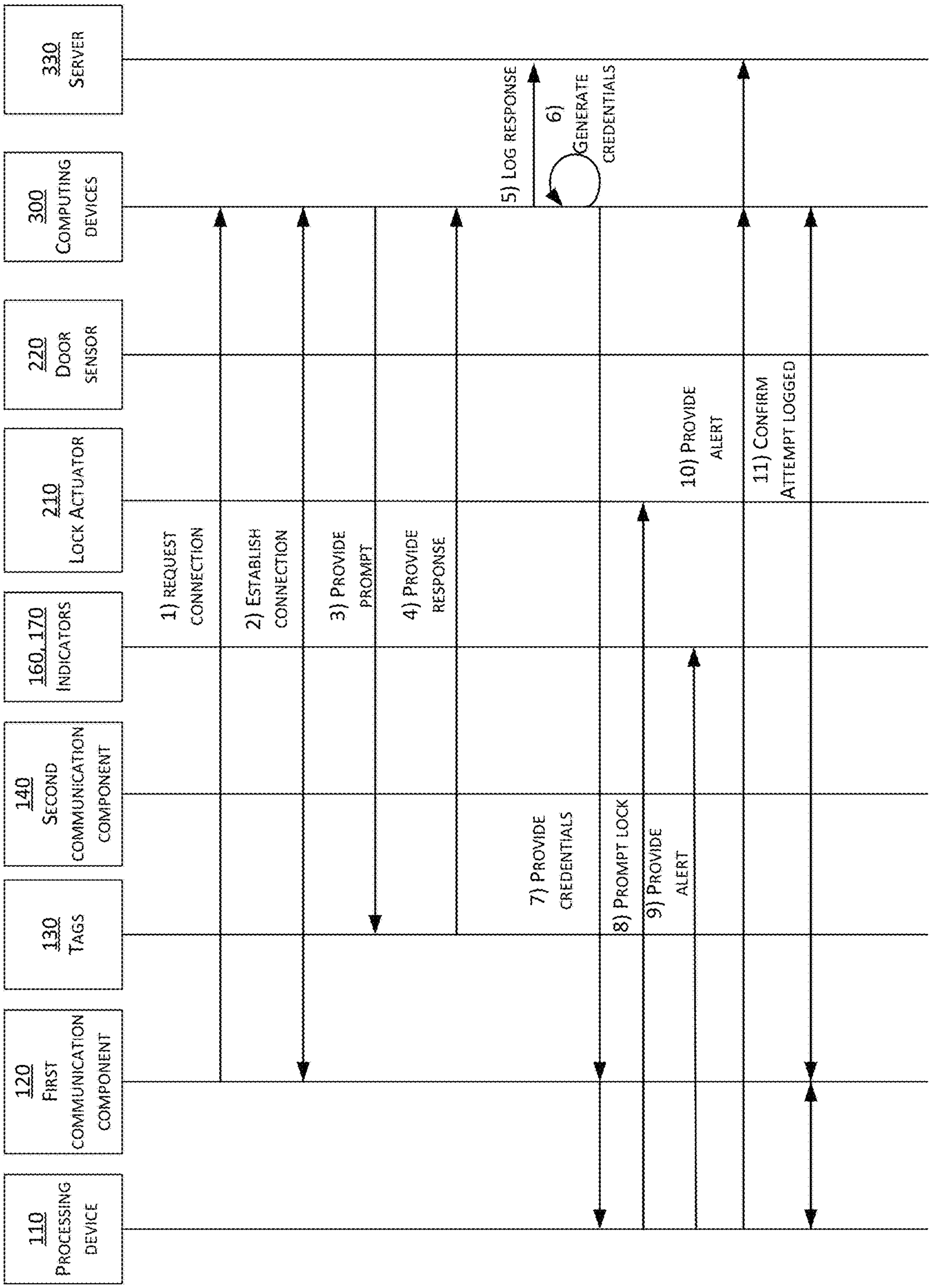
FIG. 2A illustrates an example flowchart of a method for actuating a lock component utilizing a lock sequence according to some embodiments herein.

FIG. 2A illustrates an example flowchart of a method for generating alerts based on lock operations according to some embodiments herein. In some embodiments, the first communication component 120 can request a connection with the computing devices 300 at (1). As discussed above, the first communication component 120 may request the connection by providing network communications (e.g., personal network communications) to the computing devices 300.

At (2), the first communication component 120 and the computing devices 300 may establish a connection. For example, the first communication component 120 and the computing devices 300 may establish a connection via a personal area network.

Based on establishing the connection, at (3), the computing devices 300 may provide a prompt to the lock management system via the tags 130. For example, the computing devices 300 may provide NFC data to the lock management system via the tags 130. The prompt may include a lock and/or unlock request.

In response to the prompt, the tags 130 may provide a response to the computing devices 300. For example, the tags 130 may provide NFC data to the computing devices 300. In some embodiments, the response may include an authentication request.

Based on receiving the response from the tags 130, the computing devices 300 can log the response. For example, the computing devices 300 can log the response in the server 330. In some embodiments, the computing devices 300 can log the response in a data store.

The computing devices 300 may authenticate a user in response to the response from the tags 130. In response to authenticating the user, the computing devices, at (6), can generate credentials. For example, the credentials may identify the user.

At (7), the computing devices 300 may provide the credentials to the first communication component 120. The first communication component 120 may provide the credentials to the processing device 110. In some embodiments, the processing device 110 may authenticate the credentials.

Based on authentication of the user and/or the credentials, at (8), the processing device 110 may prompt the lock by providing a data signal to the lock actuator 210. For example, the processing device 110 may cause the lock actuator 210 to actuate.

Based on non-authentication of the user and/or the credentials, at (9), the processing device 110 may provide an alert (e.g., an audible alert, visual alert, etc.) by providing a data signal to one or more of the indicators 160, 170. At (10), the processing device 110 may provide an alert to the computing devices identifying whether the user and/or the credentials were authenticated. The processing device 110 may store the alert at the server 330.

At (11), the first communication component 120 and the computing devices 300 may confirm the attempt to actuate the lock was logged. Further, the first communication component 120 and the processing device 110 may confirm the attempt to actuate the lock was logged.

Figure 2B:
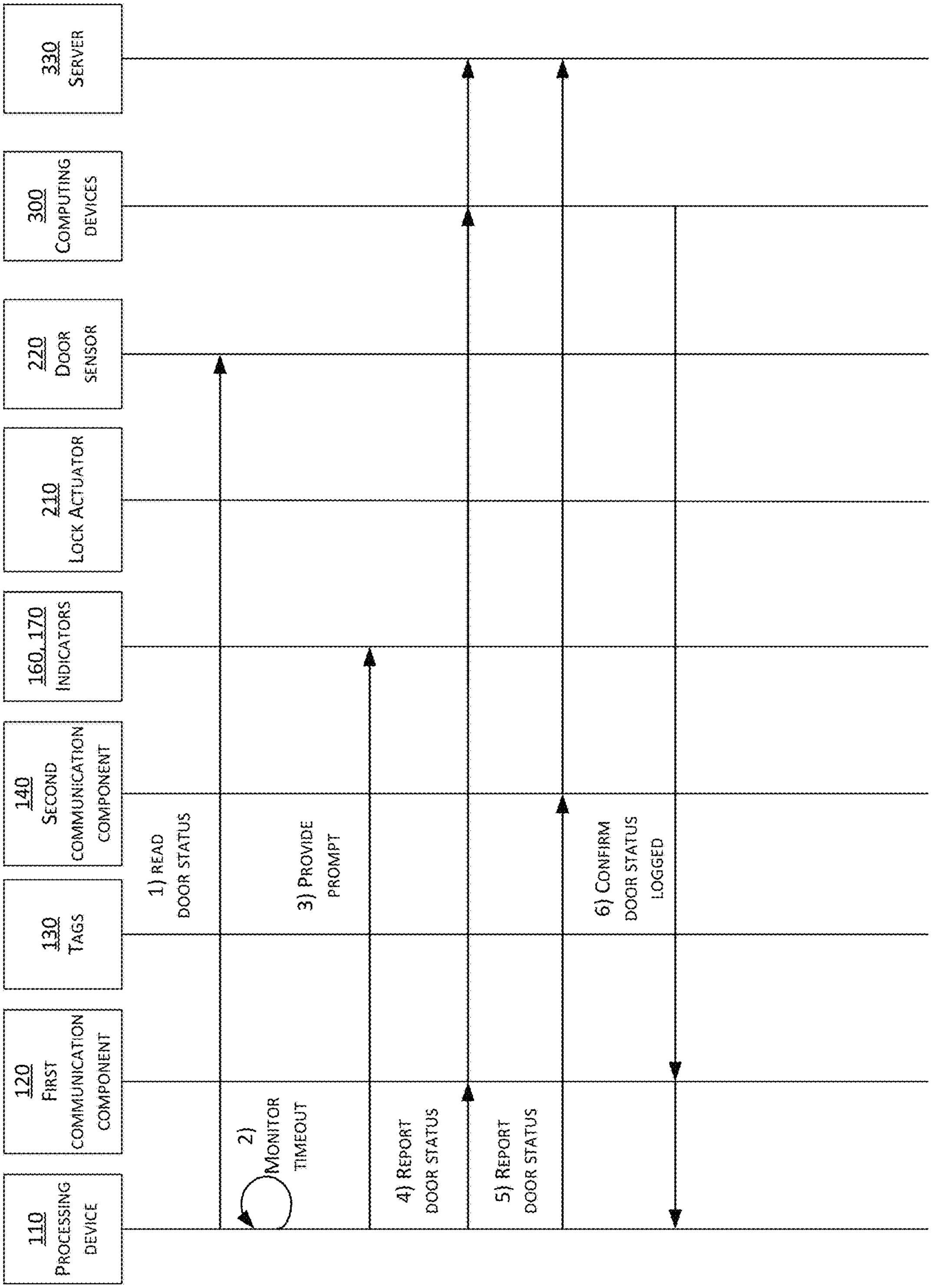
FIG. 2B illustrates an example flowchart of a method for actuating a lock component utilizing a lock sequence according to some embodiments herein.

FIG. 2B illustrates an example flowchart of a method for generating alerts based on a door status according to some embodiments herein. The lock management system may monitor the door status based on determining that a lock operation has been provided to the door. In some embodiments, the processing device 110 can read a door status from the door sensor 220 at (1). As discussed above, the door sensor 220 may generate sensor data identifying a status of a door associated with the lock (e.g., open, closed, partially open, etc.). In some embodiments, the door sensor 220 may route the sensor data to the processing device 110.

Based on determining that the door is not open, at (2), the processing device 110 may monitor a timeout. The timeout may be any time period (e.g., 30 seconds, 45 seconds, 10 minutes, etc.). In some embodiments, the timeout may be set by a user. In other embodiments, the processing device 110 may identify the timeout (e.g., using machine learning models).

Based on monitoring the timeout and determining the timeout has lapsed, at (3), the processing device 110 may provide an alert (e.g., an audible alert, visual alert, etc.) by providing a data signal to one or more of the indicators 160, 170. The alert may indicate that the door was not opened over a particular time period (e.g., the timeout).

At (4), the processing device 110 may report the door status to the first communication component 120. The first communication component 120 may report the door status to the computing devices 300. The computing devices 300 may report the door status to the server 330.

If the processing device is unable to report the door status to the first communication component 120 and/or confirm the door status was logged, at (5), the processing device 110 may report the door status to the second communication component 140. The second communication component 140 may report the door status to the computing devices 300 and/or the server 330.

At (6), the computing devices 300, the first communication component 120, and the processing device 110 may confirm the door status was logged.

Figure 2C:
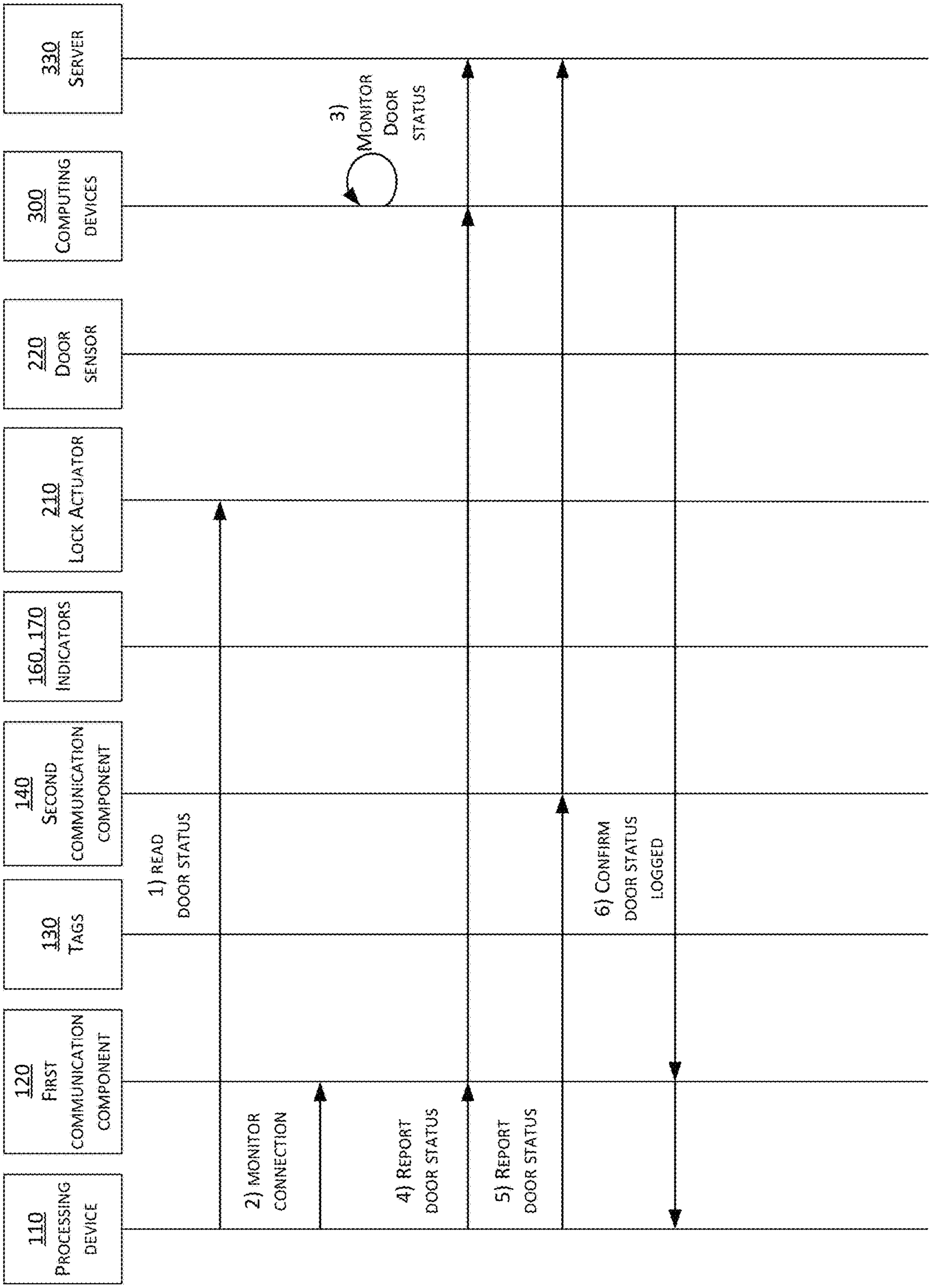
FIG. 2C illustrates an example flowchart of a method for actuating a lock component utilizing a lock sequence according to some embodiments herein.

FIG. 2C illustrates an example flowchart of a method for generating alerts based on a door status according to some embodiments herein. The lock management system may monitor the door status based on determining that a lock operation has been provided to the door. In some embodiments, the processing device 110 can read a door status from the door sensor 220 at (1). As discussed above, the door sensor 220 may generate sensor data identifying a status of a door associated with the lock (e.g., open, closed, partially open, etc.). In some embodiments, the door sensor 220 may route the sensor data to the processing device 110.

Based on determining that the door is open, at (2), the processing device 110 may monitor a connection between the first communication component 120 and the computing devices 300 to determine whether the connection is active.

At (3), the computing devices 300 may monitor the door status via a connection. For example, the computing devices 300 may monitor the door status based on determining that an indication has not been received from the processing device 110 indicating that the door was closed.

Based on determining the connection is active, at (4), the processing device 110 may report the door status to the first communication component 120. The first communication component 120 may report the door status to the computing devices 300. The computing devices 300 may report the door status to the server 330.

If the connection is not active, at (5), the processing device 110 may report the door status to the second communication component 140. The second communication component 140 may report the door status to the computing devices 300 and/or the server 330.

At (6), the computing devices 300, the first communication component 120, and the processing device 110 may confirm the door status was logged.

Figure 9:
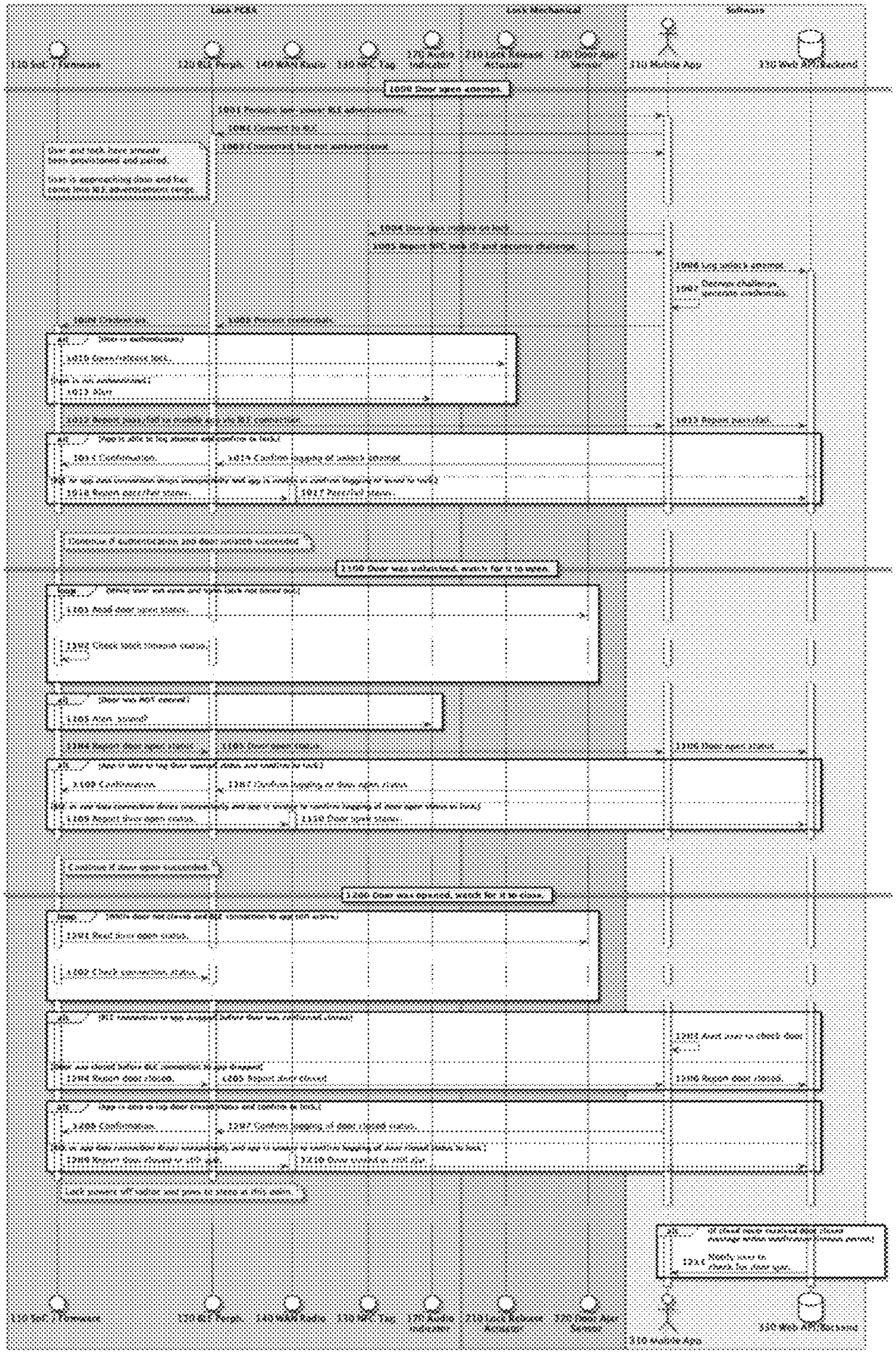
FIG. 9 illustrates an example flowchart of a method for actuating a lock component utilizing a lock sequence according to some embodiments herein.

FIG. 9 illustrates a particular embodiment of the workflow illustrated in FIGS. 2A, 2B, and 2C. FIG. 9 illustrates example methods 1000, 1100, and 1200 for enabling the unlocking/locking of a door. In the illustrative diagram, the lock management system is configured such that the computing device has been provisioned and authorized to connect with the lock management system.

At blocks 1001 through 1003 the computing device may be connected to the lock management system via BLE. In some embodiments, at block 1001, the BLE radio in the lock management system can periodically or aperiodically send an advertisement to connect with provisioned computing devices within range. In some embodiments, the periodic advertisement is happening continuously. In other embodiments, the periodic advertisement occurs at a predetermined time intervals and/or time periods.

At block 1002, a computing device (e.g., that is in range) can receive the BLE advertisement from the lock management system. At block 1003 the computing device can connect to the lock management system via the BLE connection. In some embodiments, at block 1003, the lock management system and the computing device are connected via the BLE connection, but no credentials and/or unlock commands have been sent between the two devices. In some embodiments, the BLE connection between the lock management system and computing device is a speculative BLE connection. In some embodiments, the BLE connection is instantiated prior to the user attempting to unlock the door. In some embodiments, the establishment of the speculative BLE connection allows for a faster door unlocking time when the user ultimately arrives at the door and instructs the door to unlock.

At block 1004, the user can tap or click a button or the like on the computing device near the lock management system to read the NFC tag in the lock management system. At block 1005, the NFC tag can report the lock management system ID and security challenge to the computing device. In some embodiments, if there are multiple locks within the user's BLE range, the computing device can indicate which lock the user intends to open.

At block 1006 a log entry can be sent to the cloud database for logging and indicating that an unlock attempt by the user was made.

At block 1007, the computing device can decrypt the security challenge and generate a credential. At blocks 1008 and 1009, the credential can be sent to the lock management system SoC via the BLE connection.

In some embodiments, if the user's credential is authenticated, an unlock command is sent to the lock actuator at block 1010. In some embodiments, if the credential is not authenticated, a negative alert will be indicated to the user via a light and/or sound at block 1011.

At block 1012 the status of the unlock attempt (pass or fail) can be sent to the computing device via BLE. At block 1013, the user's device can the status update to the cloud database system for logging the audit data. At block 1014 and 1015, the computing device can send a confirmation to the lock management system that the door open attempt has been logged to the cloud database system. In some embodiments, if the computing device BLE connection to the lock system is broken before the confirmation message is sent, the lock management system can use the on-board WAN radio of the lock management system to send the status update to the cloud database, as illustrated at blocks 1016 and 1017.

In some embodiments, if the unlock attempt is successful and the lock is unlatched, the lock management system can continue to monitor the status of the status of the door as illustrated at method 1100 of FIG. 9. In some embodiments, the lock management system can continuously read the door ajar sensor to see if the door is opened at block 1101 and check to see if the latch open command has timed out at block 1102.

In some embodiments, if the lock open command times out before the door was opened, the lock management system can send a timeout alert to the user via a sound and/or light on the lock management system and/or the computing device as illustrated at block 1103.

At block 1104 and 1105, the lock management system can send the door open status to the computing device via the BLE connection. At block 1106 the computing device can send that door open status update to the cloud database system. At block 1107 and 1108, the computing device can send a confirmation message to the lock management system that the door open status has been logged to the cloud database. In some embodiments, if the computing device BLE connection to the lock management system is broken or disrupted before the confirmation message is sent and/or received by the lock management system, the lock management system can use the on-board WAN radio to send the door open status update to the cloud database via a network connection, as illustrated at blocks 1109 and 1110. In some embodiments, the lock management system can send the status update via BLE connection to the computing device as this may avoid the need to power on the WAN radio, which may use more power than the BLE radio. In some embodiments, the power savings of not turning on the WAN radio, over time, can extend the life of the battery of the lock system.

In some embodiments, if the door is opened before the timeout is reached, the lock management system can continue to monitor the status of the door until it is closed, as illustrated at method 1200 of FIG. 9.

In some embodiments, the lock management system can continuously check the status of the door ajar sensor (block 1201) and check the status of the BLE connection to the computing device (1202).

In some embodiments, the BLE connection is dropped before the door is closed, and before the application of the computing device can alert the user to check that the door was closed as illustrated at block 1203. In some embodiments, if the door is closed while there is still a BLE connection, the lock management system can report the door status to the computing device and the computing device can report the status to the cloud database, as illustrated at blocks 1204, 1205 and 1206.

At blocks 1207 and 1208, the computing device can send a confirmation message to the lock management system that the door closed/ajar status has been logged to the cloud database. In some embodiments, if the BLE connection between the lock and the computing device is broken before the status is reported, the lock management system can use an on-board WAN radio to report the status to the cloud database as illustrated at blocks 1209 and 1210. In some embodiments, the use of the WAN radio is used as the last attempt to report status because use of the WAN radio may use more battery power as compared to other components of the lock management system.

In some embodiments, after the lock management system locks the door, the lock management system can be powered off and set to sleep mode.

At block 1211, if the cloud database has not yet received a status update indicating that the door is closed, the cloud database system server can notify the user via the application of the computing device to check the door to make sure that the door was not unintentionally left open and/or unlocked.

In some embodiments, pre-connecting to the smart lock via a BLE connection before being authorized by the lock management system allows the BLE connection to advertise at reduced power-saving intervals. In some embodiments, the foregoing implementation can save battery power, while also reducing latency as illustrated at blocks 1001-1003.

In some embodiments, the lock management system can use a read-only NFC tag to provide both a lock ID and a security challenge. In some embodiments, the use of a read-only NFC tag can resolve two issues with BLE connections. In some embodiments, if the user's phone is authorized to open multiple doors in an area, the read-only NFC tag identifies which door to open. In some embodiments, the lock management system can confirm that the user is at the door when the user is attempting to open, which can add security.

In some embodiments, the lock management system comprises a pre-loading lock identification for which the user is allowed access. In some embodiments, the computing device application can connect to locks for which the computing device has access. In some embodiments, this configuration saves battery life by avoiding unnecessary BLE connections. In some embodiments, the lock management system can connect to more than one lock if in range and user is authorized to open the one or more lock management systems. In some embodiments, the configuration above allows the user open any of the pre-connected locks, with minimal latency.

In some embodiments, the lock management system can use a BLE received signal strength indicator ("RSSI") signal strength to determine which lock is the closest to avoid making multiple BLE connections.

In some embodiments, the lock management system can use knowledge of a user's path through a building to understand which lock or locks the user may approach first.

In some embodiments, the lock management system can use the WAN radio to update audit logging events if the computing device application cannot confirm to the lock that it has performed that function. In some embodiments, the WAN radio is a fallback in case the BLE and/or computing device are not able to perform the audit log, but the WAN radio may be used when the audit log transmission via the BLE connection fails because the WAN radio uses more battery power.

4.0 Remote Unlock

As discussed above, the lock management system and/or the lock system may facilitate the operations to actuate a lock. The lock management system and/or the lock system can initialize one or more components and perform the operations.

Figure 3:
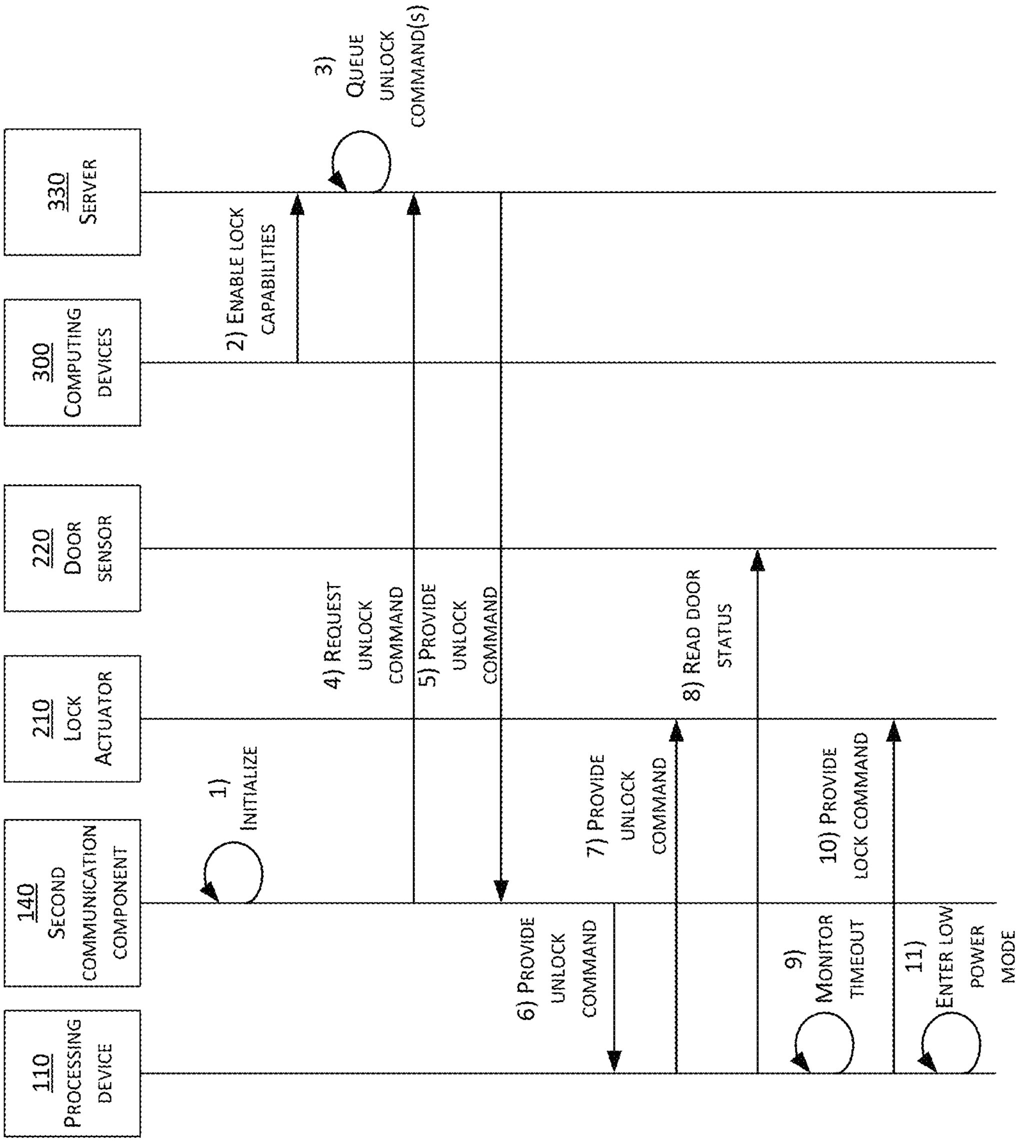
FIG. 3 illustrates an example flowchart of a method for actuating a lock component according to some embodiments herein.

FIG. 3 illustrates an example flowchart of a method for facilitating the operations to actuate the lock according to some embodiments herein. In some embodiments, the second communication component 140 can initialize at (1). For example, the processing device 110 can initialize the second communication component 140 by providing power (e.g., a lower power as compared to a full power mode of the component) to the second communication component 140.

At (2), the computing devices 300 can enable lock capabilities via the server 330. The computing devices 300 can enable a component of the server 330 to store lock commands for the lock management system. Based on enabling the lock capabilities, at (3), the server 330 may queue one or more unlock commands (and/or lock commands). For example, the server 330 may queue commands from the computing devices 300.

In response to being initialized, at (4), the second communication component 140 can request an unlock command(s) (and/or lock command(s)) from the server 330. At (5), the server 330 can provide the unlock command(s) from the server 330. At (6), the second communication component 140 can provide the unlock command(s) to the processing device 110.

At (7), the processing device 110 can provide the unlock command(s) to the lock actuator 210. In response to receiving the unlock command(s), the lock actuator 210 may actuate.

At (8), the processing device 110 can read a door status from the door sensor 220. The processing device 110 may read the door status within or after a timeout period based on providing the unlock command(s) to determine if the lock actuator 210 actuated and the door opened.

At (9), the processing device 110 can monitor a timeout based on determining the door was opened. Based on determining that the timeout has elapsed, at (10), the processing device 110 can provide a lock command to the lock actuator 210.

Based on providing the lock command to the lock actuator 210, determining that the lock actuator 210 actuated, and/or determining the door is closed, at (11), the processing device 110 can enter a low power mode. During a low power mode, the processing device 110 may consume less power as compared to a full power mode (e.g., the processing device 110 may be in a full power mode when providing lock and/or unlock commands).

Figure 10:
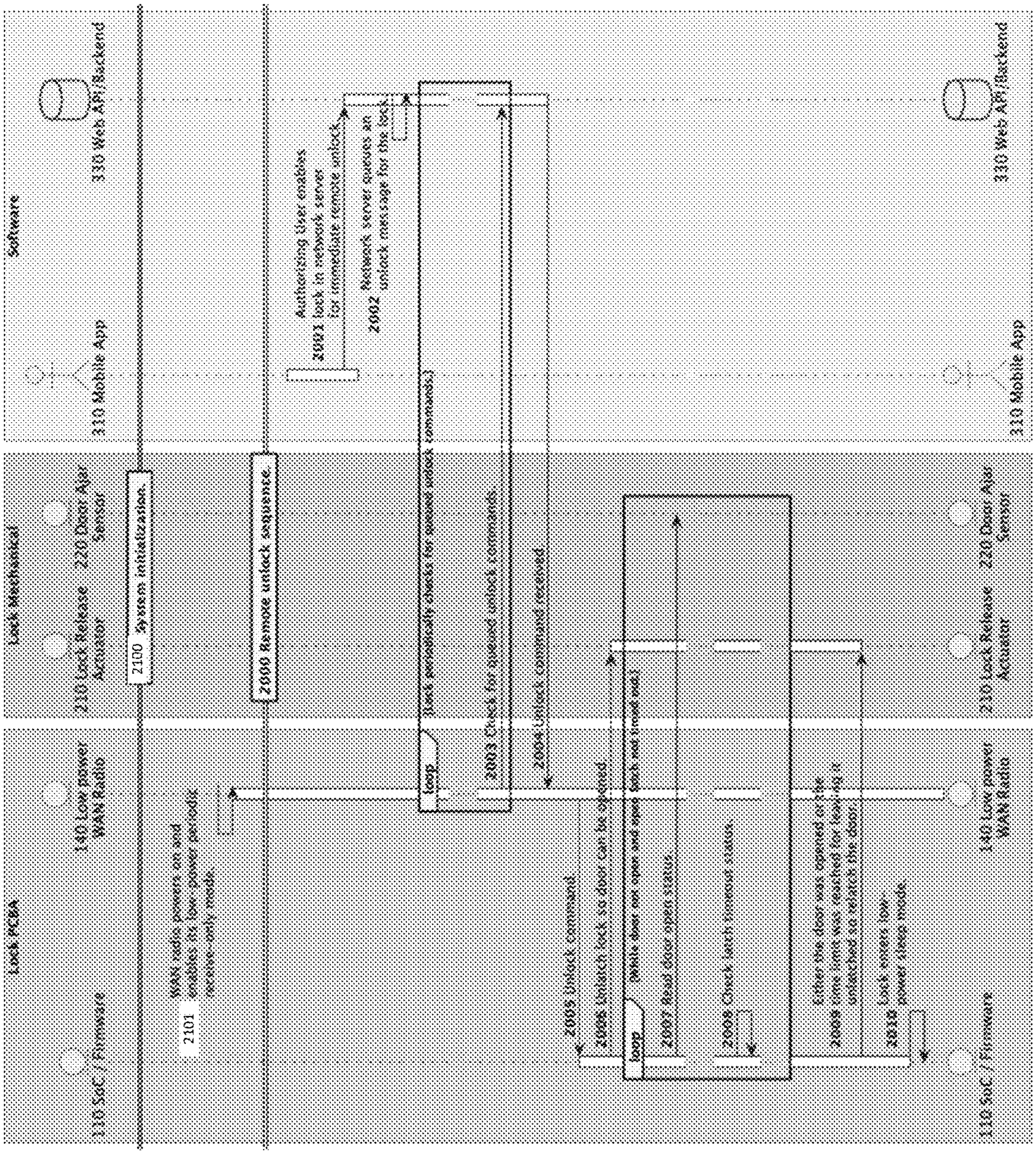
FIG. 10 illustrates an example flowchart of a method for actuating a lock component according to some embodiments herein.

FIG. 10 illustrates a particular embodiment of the workflow illustrated in FIG. 3. FIG. 10 illustrates an example methods 2100 and 2000 for actuation of a lock actuator. At block 2101 the low power WAN radio can power on and enables the low-power periodic receive only mode.

After a period of time passes, at block 2001 a user who is authorized to open a door can log into a management application operated on a computing device and enable the feature such that the door can be remotely unlocked immediately.

At block 2002, the network server can queue the unlock message for the lock. In some embodiments, the lock management system may truncate the unlock message for the lock into a single unlock command to eliminate repeated unlock attempts by the user.

When the WAN low-power mode is on, the lock management system can continue to periodically check the cloud database for queued unlock commands, as illustrated at block 2003 of the diagram.

At block 2004 and 2005, the lock management system can allow the cloud backend to send the unlock command to the lock in response to the low power WAN radio's periodic checks.

At block 2006, if unlock command has been received by the SoC, the SoC can activate the lock release, for the user to be able to open the door. In some embodiments, the lock would remain in the locked state in the situation where no unlock command was received from the cloud server.

In some embodiments, while the door is not opened and the latch is unlocked, the lock management system can continue to monitor the door ajar sensor to read door open status, as illustrated at block 2007 of the diagram. In some embodiments, if the door is not opened by the user after a predetermined time interval, the lock management system can automatically lock so it is not left in the unlocked position. At block 2008, the lock management system can monitor the latch timeout status.

In some embodiments, either the door was opened or the time limit was reached for leaving the lock unlatched, the SoC may deactivate the lock release back to a locked state.

At block 2010, the SoC can power off the network connectivity radio to return to a power-saving sleep mode.

5.0 User Authentication

Figure 4A:
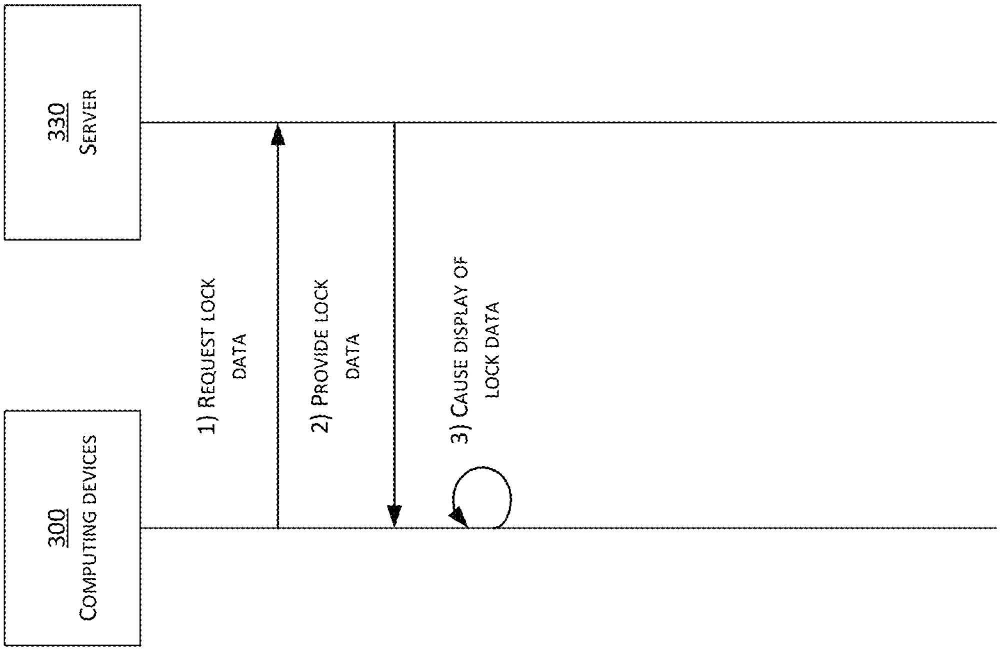
FIG. 4A illustrates an example flowchart of a method for actuating a lock component according to some embodiments herein.

As discussed above, the lock management system and/or the lock system may facilitate the operations to authenticate a user. FIG. 4A illustrates an example flowchart of a method for displaying lock data. At (1), the computing devices 300 can request lock data (e.g., access credentials) from the server 330. The lock data may include login information (e.g., username, password, pin, etc.), lock identification information, a schedule (e.g., a schedule for use of a lock), a list of permitted uses, etc. The lock data may be associated with a particular account. At (2), the server 330 can provide the lock data to the computing devices 300. At (3), the computing devices 300 can cause display of at least a portion of the lock data (e.g., the login information) via a display of the computing devices 300.

Figure 4B:
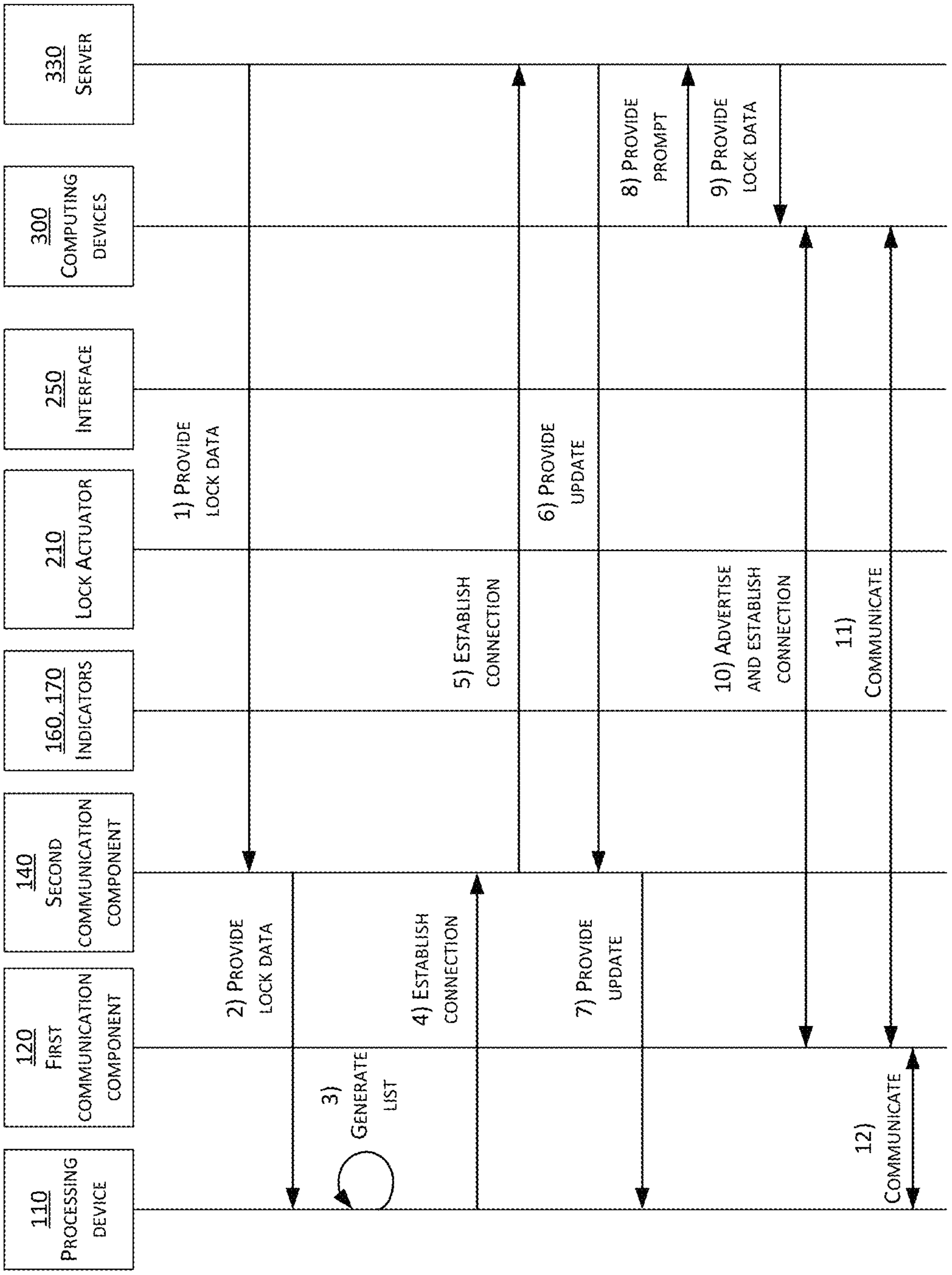
FIG. 4B illustrates an example flowchart of a method for updating lock data according to some embodiments herein.

FIG. 4B illustrates an example flowchart of a method for providing lock data to the lock management system. If the processing device 110 is connected to receive updated lock data from the server 330, at (1), the server 330 can provide lock data to the second communication component 140. At (2), the second communication component 140 can provide the lock data to the processing device 110. Based on receiving the lock data, at (3), the processing device 110 can generate a list of lock data (e.g., a list of login information and locks).

If the processing device 110 is not connected to receive updated lock data from the server 330 (before, after, or separate from receiving lock data via the second communication component), at (4), the processing device 110 can establish a connection with the second communication component 140. At (5), the second communication component 140 can establish a connection with the server 330. At (6), the server 330 can provide the updated lock data to the second communication component 140 via the connection, and, at (7), the second communication component 140 can provide the updated lock data to the processing device 110.

At (8), the computing devices 300 can prompt the server 330 for lock data. For example, the computing devices 300 can prompt the server 330 for lock data to actuate a lock. In response to the prompt, at (9), the server 330 can provide the lock data (e.g., updated lock data) to the computing devices 300.

Based on receiving the lock data, at (10), the computing devices 300 can advertise and establish a connection with the first communication component 120. At (11), the computing devices 300 can communicate with the first communication component 120 to provide the lock data and/or request operations. At (12), the first communication component 120 can communicate with the processing device 110 to provide the lock data and/or request the operations.

Figure 4C:
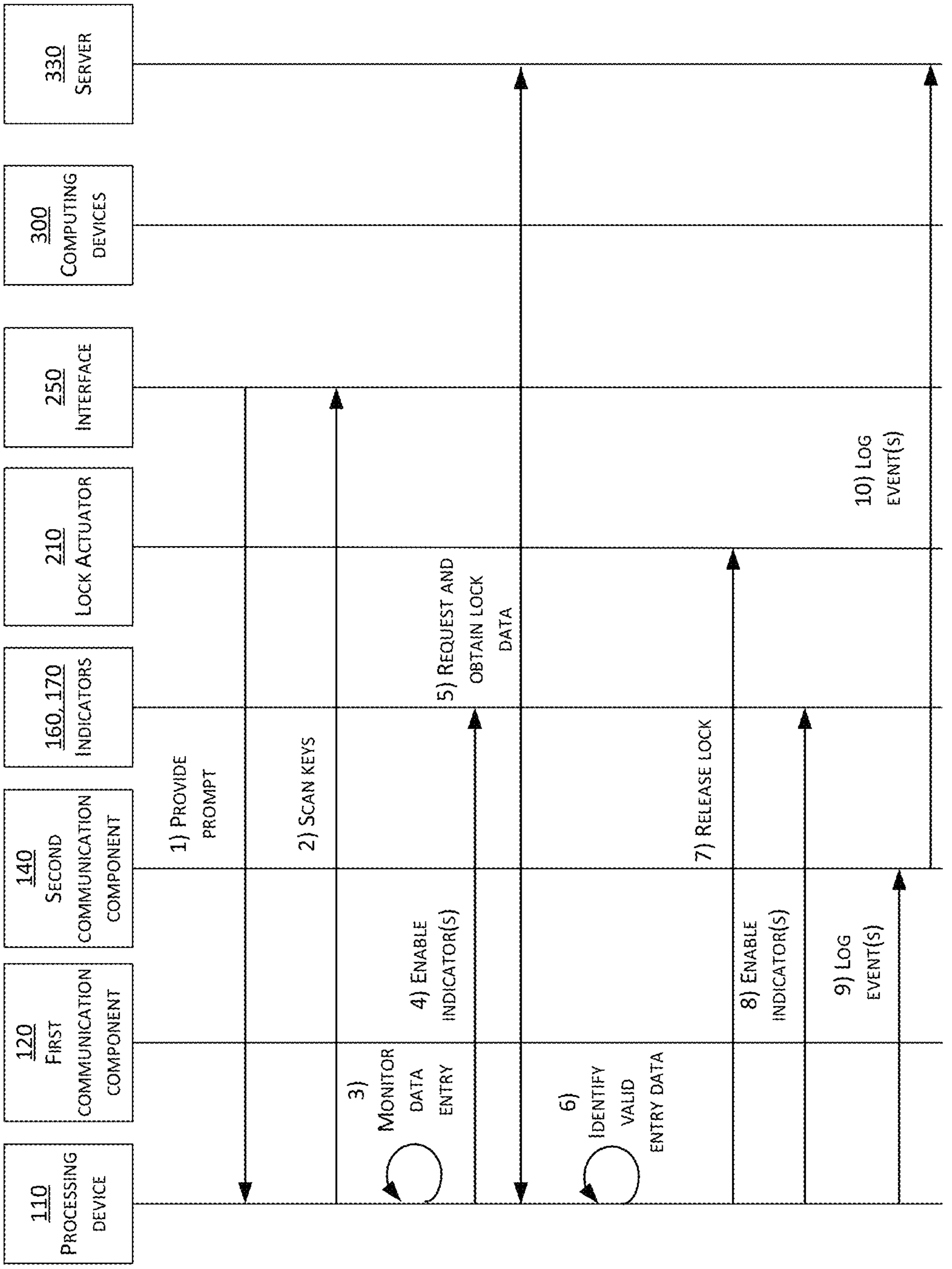
FIG. 4C illustrates an example flowchart of a method for updating lock data according to some embodiments herein.

FIG. 4C illustrates an example flowchart of a method for logging entry events. At (1), the interface 250 can provide a prompt to the processing device 110. For example, a user can provide a prompt via the interface 250. The processing device 110 may initialize in response to the prompt. At (2), the processing device 110 can receive credential information from the interface 250. For example, the processing device 110 can scan for keys (e.g., input) provided via the interface. Based on scanning keys, at (3), the processing device 110 can monitor the data entry.

Based on a status of the keys, at (4), the processing device 110 can enable the indicators 160, 170. For example, the processing device 110 can cause at least one of the indicators 160, 170 to output data indicating whether a key is valid or invalid.

At (5), the server 330 (and/or the computing devices 300) can request and obtain lock data from the processing device 110. For example, the processing device 110 may periodically or aperiodically update the lock data and the server 330 may receive the updated lock data from the processing device 110.

At (6), the processing device 110 can receive entry data (e.g., an input). In response to validating the entry data, at (7), the processing device 110 can release the lock (e.g., cause an unlocking event to occur) by actuating the lock actuator 210. At (8), the processing device 110 can enable the indicators 160, 170. For example, the processing device 110 can cause at least one of the indicators 160, 170 to output data indicating that the lock was released.

At (9), the processing device 110 can log the unlocking event by providing the event to the second communication component 140. At (10), the second communication component 140 can log the unlocking event at the server 330.

Figure 11:
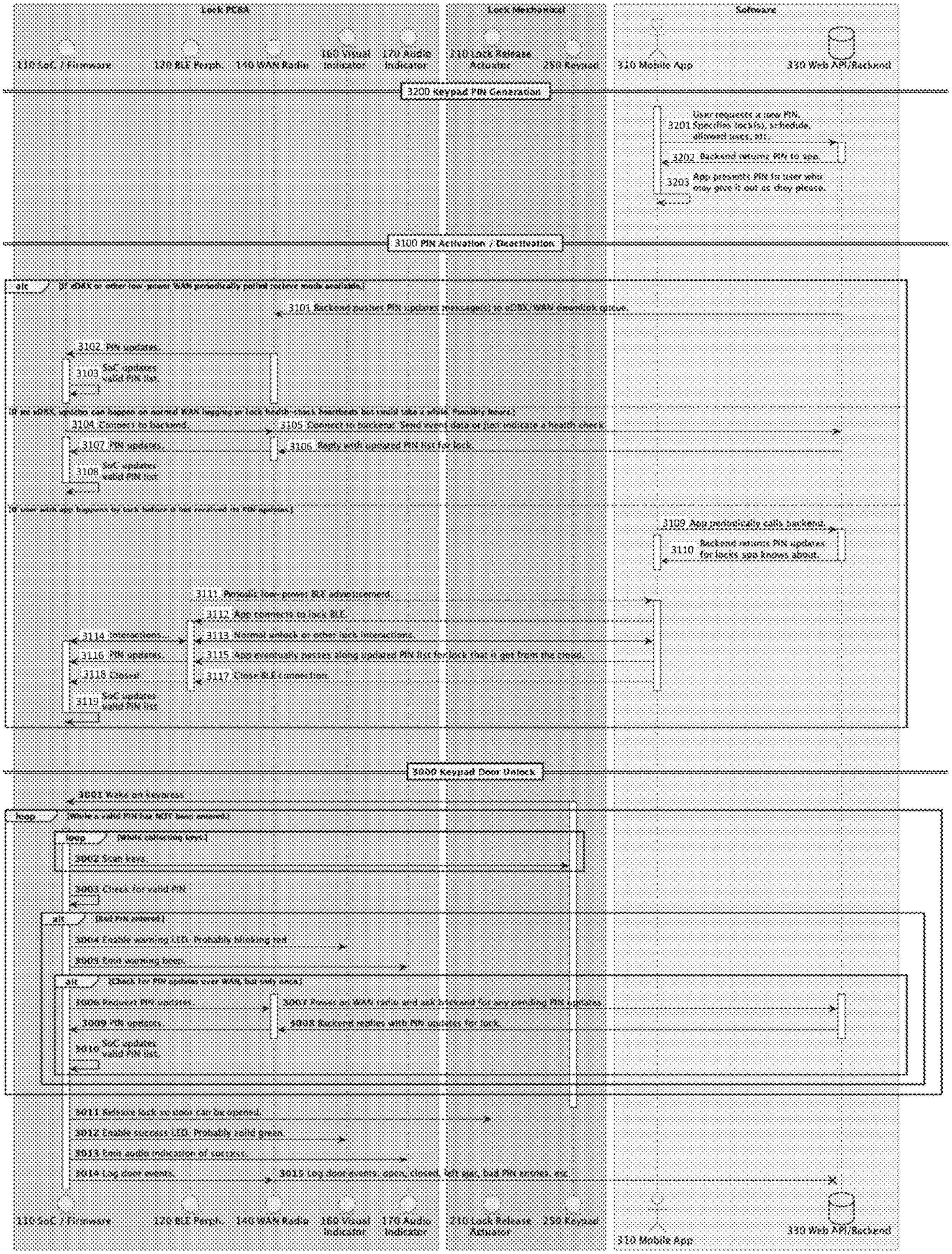
FIG. 11 illustrates an example flowchart of a method for updating lock data according to some embodiments herein.

FIG. 11 illustrates a particular embodiment of the system illustrated in FIGS. 4A, 4B, and 4C. FIG. 11 illustrates an example methods 3200, 3100, and 3000 for an authentication of a user. In some embodiments, the lock management system includes a keypad as another authentication mode for the user to input credential or code. In some embodiments, the lock management system implements an example process to enable the unlocking/locking of a door via pin or code credential and the update of the pin or code credential.

At block 3201, a user who is authorized to open a door, can log into a management application and request a new pin access credential to be generated. In some embodiments, the user may configure the pin access credential to allow unlocking to happen a certain number of times (for example, only once) and may assign a time window during which remote unlock is enabled (for example, next 30 minutes) or may assign a specific lock management system and/or building that this feature is enabled. In some embodiments, the user can set up a recurring schedule where unlock is enabled periodically (e.g., for regularly scheduled service people to gain entrance to the space). In some embodiments, the pin access credential may be associated with another user's account, email, or phone number.

At block 3202, the lock management system may return a pin access credential to the requesting user's application.

At block 3203, the application may present pin access credential to the user who requested it or to the user that was invited.

In some embodiments, if extended discontinuous reception ("eDRX") or any other low-power WAN periodically polled receive mode is available, the lock management system can push single or multiple pin access credential and update messages to eDRX enabled WAN downlink queue at block 3101.

At block 3102, the pin access credential and update messages received by the WAN radio may be sent to the SoC. In some embodiments, valid pin access credentials are stored locally in the SoC for faster authorizing of pin access credentials.

At block 3103, the SoC can update the valid pin access credentials stored in the SoC.

In some embodiments, if there are no eDRX or other low-power WAN periodically polled receive mode is available, the SoC may initiate the WAN radio to connect to the backend as illustrated at block 3104.

At block 3105, the WAN radio can connect to the backend to send event data or to indicate lock status or health check.

In some embodiments, when the WAN radio connects to the backend to send event data or to indicate lock status or health check, the backend may return with an updated list of valid pin access credentials for which is sent to the SoC as illustrated at block 3106 and 3107.

At block 3108, the SoC can update the valid pin access credentials stored in the SoC.

In some embodiments, if a user unlocks or locks the smart lock using an application of the computing device before the smart lock received an updated list of valid pin access credentials from the backend, the valid pin access credentials can be sent to the smart lock through the application of the computing device. This would allow shorter wait-time for the valid pin access credentials to be updated on the SoC.

At block 3109, the application can periodically call the backend for updates and, at block 3110, the backend may return an updated list of valid pin access credentials for the smart locks that the app knows about.

In some embodiments, the valid pin code list can be updated by the computing device associated with the application.

After a period of time passes, at block 3111, the lock management system can enter the process when the smart lock detects the presence of a computing device during periodic low-power BLE advertisements.

At block 3112, the computing device, via the application, can connect to the smart lock BLE.

At block 3113 and 3114, the user may initiate the unlock command on the application or performs other interactions with the smart lock device.

In some embodiments, after all door lock, unlock, or other interactions are complete, the computing device, via the application, sends the updated list of valid pin access credentials through the smart lock BLE which may then be sent to the SoC as illustrated at block 23115 and 3116.

In some embodiments, the computing device, via the application, closes the BLE connection through the BLE peripheral with the smart lock SoC as illustrated at block 3117 and 31018.

At block 3119, the SoC can update the valid pin access credentials stored in the SoC.

In some embodiments, the SoC can be woken by a press on the keypad, and then check the cloud for a new update to the PIN list.

At block 3001, the SoC can wake up when a key is pressed on the keypad.

At block 3002, the SoC can continue to collect and scans the keys when pressed on the keypad. At block 3003, the SoC can check for a valid pin access credential. In some embodiments, if the pin access credential is not valid, a negative alert can be indicated to the user via a light and/or sound at block 3004 and 3005.

In some embodiments, if the pin access credential is not valid, the SoC may initiate the WAN radio to power on and request the backend for any pending valid pin access credentials once as illustrated at block 3006 and 3007.

In some embodiments, the backend may return an updated list of valid pin access credentials of which is sent to the SoC as illustrated at block 3008 and 3009.

In some embodiments, at block 3010, the SoC can update the valid pin access credentials stored in the SoC.

In some embodiments, if a valid pin access credential was entered on the keypad, the SoC can activates the lock release, and the user can open the door as illustrated at block 3011. In some embodiments, a light and/or sound can be used on the smart lock to indicate to the user that the door is now unlocked and accessible as illustrated at block 3012 and 3013.

In some embodiments, the lock management system can log the door events and send it to the backend using the WAN radio as illustrated at block 3014.

6.0 Unlock Sequence

As discussed above, the lock management system and/or the lock system may facilitate the operations to actuate a lock. The lock management system and/or the lock system can determine particular operations to initialize for an authentication process.

Figure 5:
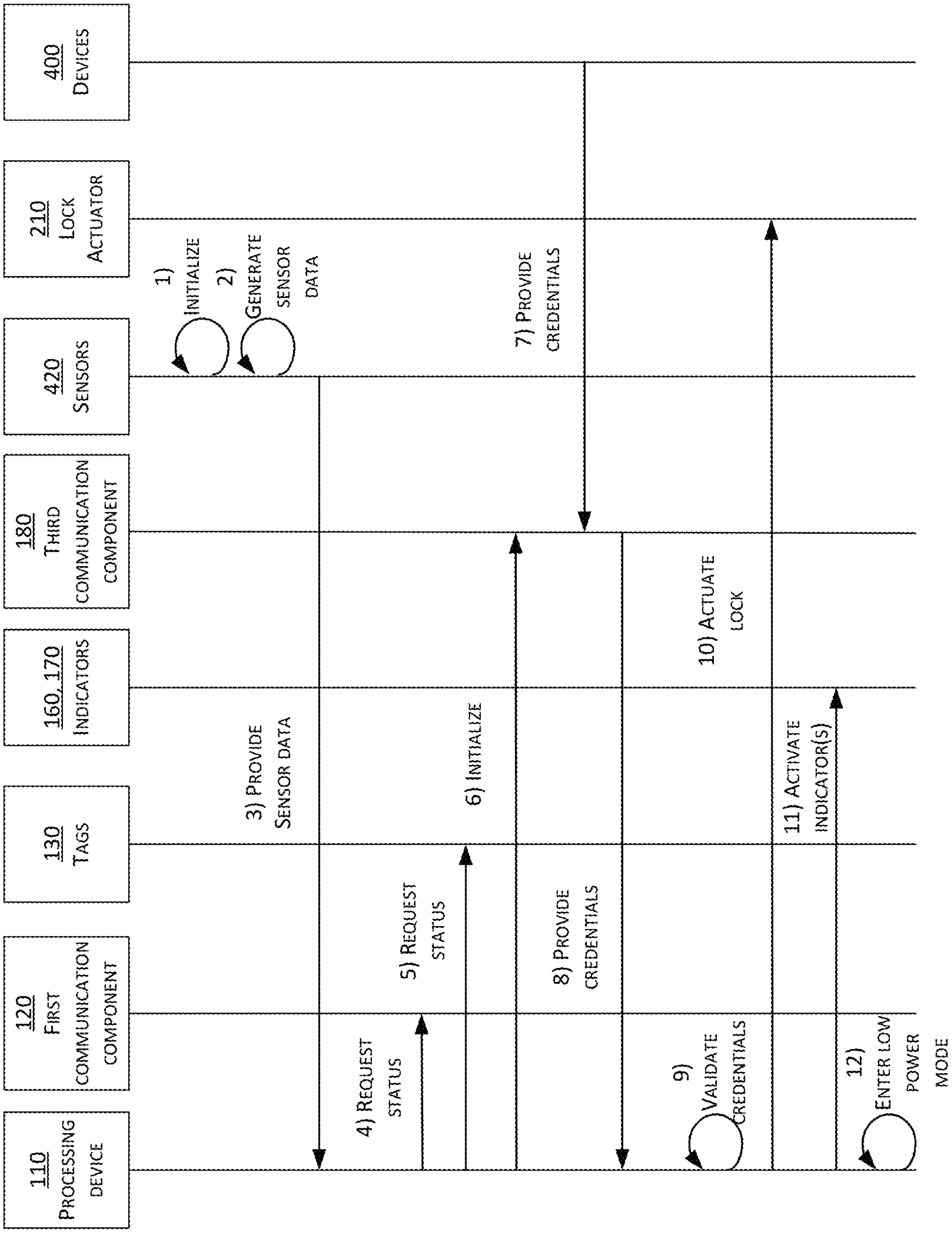
FIG. 5 illustrates an example flowchart of a method for utilizing lock data according to some embodiments herein.

FIG. 5 illustrates an example flowchart of a method for initializing components for the authentication process according to some embodiments herein. In some embodiments, the sensors 430 can initialize at (1). For example, the processing device 110 (or a separate component) can initialize the sensors 430 by providing power (e.g., a lower power as compared to a full power mode of the component) to sensors 430. The sensors 430 may include one or more of a proximity sensor, a light sensor, a contact sensor, a position sensor, or any other sensor.

At (2), the sensors 430 can generate sensor data. For example, the sensor data may include proximity data, image data, audio data, contact data, position data, etc. identifying the presence of a user. At (3), the sensors 430 can provide the sensor data to the processing device 110. In some embodiments, the sensors 430 can provide the sensor data to the processing device 110 and initialize the processing device 110 from a low power mode to a full power mode.

At (4), the processing device 110 can request a status from the first communication component 120. For example, the processing device 110 can request data identifying whether the first communication component 120 has received data communications. At (5), the processing device 110 can request a status from the tags 130. For example, the processing device 110 can request data identifying whether the tags 130 have received data communications.

Based on determining the tags 130 and/or the first communication component 120 have not received data communications, at (6), the processing device 110 can initialize the third communication component 180. For example, the processing device 110 (or a separate component) can initialize the third communication component 180 by providing power (e.g., a lower power as compared to a full power mode of the component) to the third communication component 180. At (7), the devices 400 can provide credentials (e.g., access credentials) to the third communication component 180. At (8), the third communication component 180 can provide the credentials to the processing device 110.

At (9), the processing device 110 can validate the credentials. For example, the processing device 110 can access a cache, data store, etc. and confirm the credentials are associated with an authenticated user and/or are valid credentials.

At (10), the processing device 110 can provide a lock command to the lock actuator 210. At (11), the processing device 110 can activate the indicators 160, 170. For example, the processing device can provide image data, audio data, etc. via the indicators 160, 170.

At (12), the processing device 110 can enter a low power mode. During a low power mode, the processing device 110 may consume less power as compared to a full power mode (e.g., the processing device 110 may be in a full power mode when providing lock and/or unlock commands).

Figure 12:
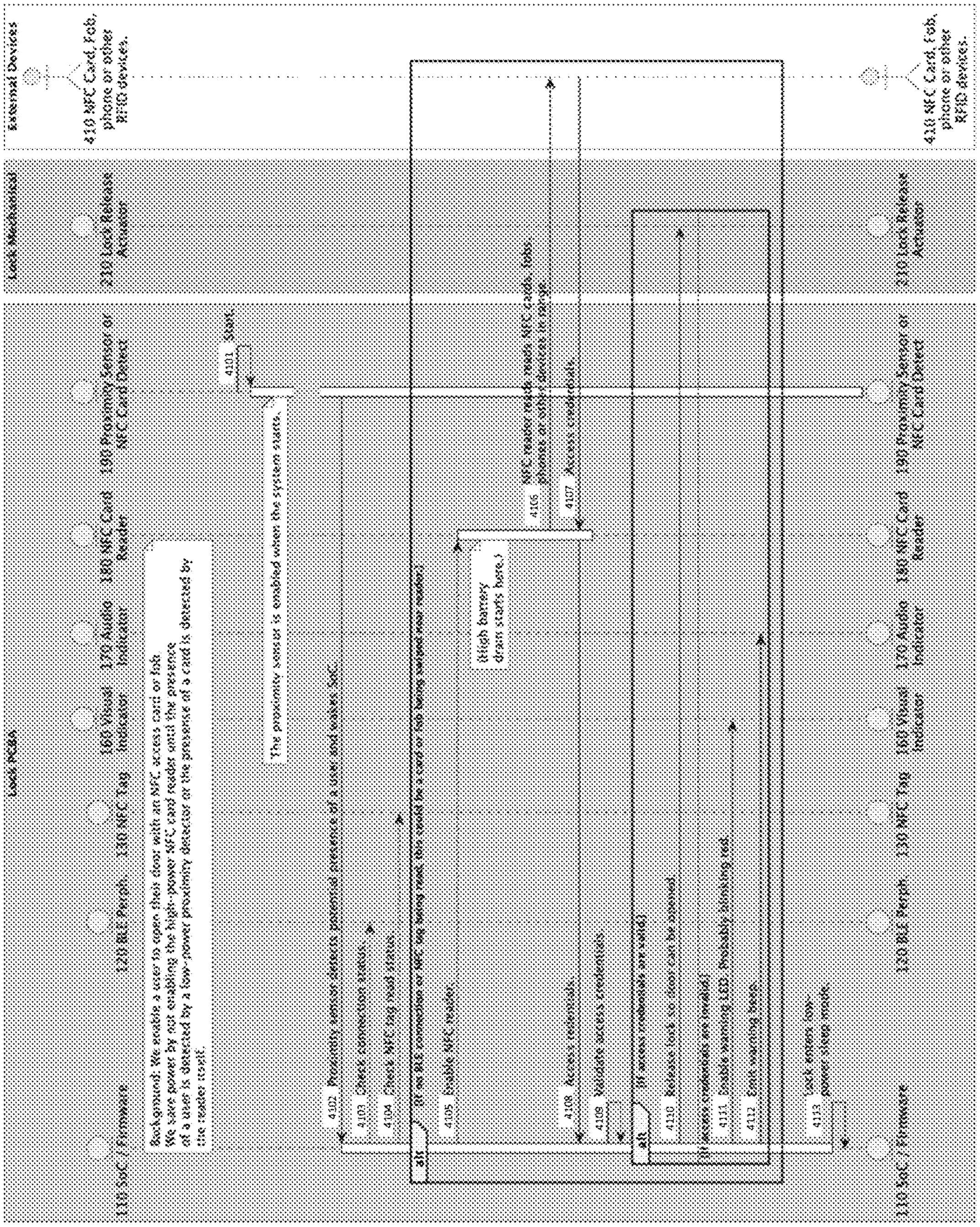
FIG. 12 illustrates an example flowchart of a method for actuating a lock component according to some embodiments herein.

FIG. 12 illustrates a particular embodiment of the system illustrated in FIG. 5. FIG. 12 illustrates an example system for an unlock sequence to implement use of a proximity sensor to power on an NFC reader when the NFC reader is needed in order to conserve power consumption as described in process 4100.

At block 4101, the lock management system can use the proximity detection sensor or NFC card reader to detect a user and initiate the illustrated process. In some embodiments, the proximity detection or NFC card detect sensor is a device that can detect the presence of a person or object within a predetermined range. The lock management system and/or the lock system disclosed herein can include any type of proximity sensors, including but not limited to IR, PIR, sonar, microwave, acoustic, capacitive, inductive sensors and any other appropriate proximity, motion or presence detecting sensor. In some embodiments, the lock management system can enable the proximity sensor to remain in a powered on mode continuously.

Based on the proximity sensor and/or the NFC card reader detecting a possible user or NFC device entering a predetermined distance range, the presence sensor can send a communication to the lock SoC (System-on-a-Chip) to alert it of a detection, as illustrated at block 4102.

At blocks 4103 and/or 4104, the lock can check to see if the user is unlocking the door with a credential type that does not require use of the NFC reader. If the user is unlocking with a different credential type, the NFC reader is not needed and can be left off. At block 4103 the lock can determine if there is a BLE connection with an authorized computing device which could indicate that the user is unlocking with BLE and not NFC. At block 4104, the lock can determine if a computing device is attempting to read the lock's NFC tag, which would not require use of the lock's NFC reader.

In some embodiments, if there is not a BLE connection and the NFC tag is not being read, the lock management system may determine a user is attempting to unlock the door with a key fob or card, and initiate the NFC card reader to read the credential. At block 4105, the SoC can initiate the NFC reader.

At blocks 4106 and/or 4107 the NFC card, fob, phones or other devices are read by the NFC card reader. At block 4106, the NFC reader can read the NFC credential and at block 4107 the access credential can be sent to the reader.

At block 4108, the access credential can be sent to the SoC and at block 4109 the SoC can validate the access credential. At block 4109, the lock management system can use any number of security protocols known to those with ordinary skill in the art to validate the authenticity of the credential being presented.

In some embodiments, if the lock management system validates the access credential, at block 4110, the SoC can release the lock actuator, unlocking the door, and granting access to the user. The SoC can send signals to initiate lights or sounds to indicate to the user that the door is unlocking. In some embodiments, if the lock management system is unable to validate the access credential, the SoC can send a signal to turn on a negative light and/or sound to indicate that the access credential was not validated, as illustrated at blocks 4111 and/or 4112.

In some embodiments, whether the access credential was validated or not, the process can end and one or both of the NFC reader and the lock SoC can enter sleep mode (e.g., low power mode), as illustrated at blocks 4113. In some embodiments, the proximity sensor may remain at full power mode to detect if another user approaches.

In some embodiments, the lock management system can, during any of the blocks herein, send status notifications to the cloud via an onboard WAN radio or other radio network. In some embodiments, the status notification can be used to alert users, via, for example, an application on a computing device, that someone is accessing the door, and/or to create a record of door entries that could be accessed at a later time.

In some embodiments, if a user's phone is connected to the lock via BLE, the lock management system can report the status to the application on the computing device. This status can include any information about the unlock sequence, such as recording that the door was opened, closed, how long it was left open, which user unlocked the door, etc. Once this status update has reached the computing device it can be stored there or sent to the cloud using the phone's WAN radio or other radio network.

In some embodiments, the lock management system can keep the NFC powered off until a user's presence and/or NFC field is detected. This configuration can enable the lock management system to save power in a battery powered device. Because NFC read range is very small, the presence detector could be set to only trigger when the user's hand, card, or computing device is within inches of the lock.

7.0 Smart Lock Remote Unlock Without Computing Device

In some embodiments, the lock management system can enable a method to remotely wake up. In some embodiments, the lock management system can send an unlock command to a smart lock when a user accessing or entering a door is not associated with and/or does not have access to a computing device or other means of communication, which can be during when the lock management system is in a deep power-saving mode.

In some embodiments, the lock management system can be configured for Internet connectivity using WiFi, LTE, or other types of wireless network connections. In some embodiments, the lock management system using a wireless network connection can remotely unlock doors for users who are not normally authorized and/or who may have misplaced their entry fob, card, or other security token. In some embodiments, remote unlock is also useful in home-sharing scenarios where authorized users may change frequently.

In some embodiments, the authorized user can schedule dates and times where remote unlocks are enabled. In some embodiments, the authorized user can designate a certain number of times the door can be remotely unlocked. For example, the authorized user may allow one remote unlock when the user anticipates one guest to arrive at the residence, but do not want the door to be able to be unlocked subsequent times.

In some embodiments, in order to receive unlock requests, a radio can be powered on and enabled to receive incoming transmissions. In some embodiments, radios in this constant always on mode can use significant amounts of power.

In embodiments where the lock system is battery powered, it may not be feasible and/or efficient and/or allow the lock system to function without frequent battery changing and/or charging when the radio is powered on at all times, because, in some embodiments, such situations may drain the batteries of the lock system.

In some embodiments, the lock management system may only power the radio on periodically to check for incoming unlock commands. In some embodiments, this results in a power savings of 40%, 45%, 50%, 55%, 60%, 65%, 70%, 75%, 80%, 85%, 90%, 95%, or the like.

Figure 13:
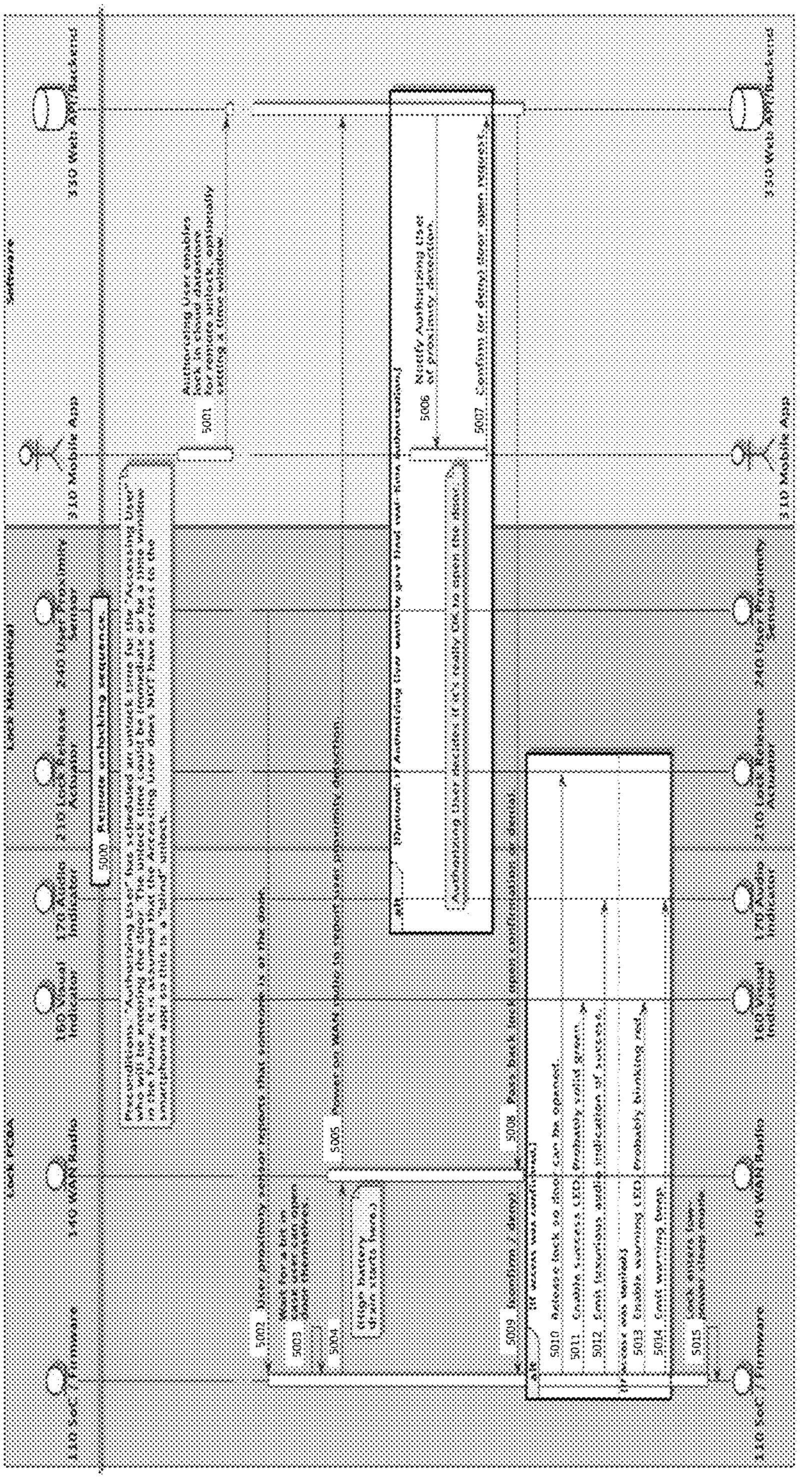
FIG. 13 illustrates an example flowchart of a method for enabling a low power mode according to some embodiments herein.

FIG. 13 illustrates an example flowchart of a method 5000 for enabling the low power mode to periodically check incoming unlock commands.

At block 5001 a user who is authorized to open a door logs into a management application operated on a computing device or other device and enables the feature such that the door can be remotely unlocked. In some embodiments, the user may configure the unlock event to happen a certain number of times, for example, once, and/or may assign a time window during which remote unlock is enabled, for example, for the next 5 minutes. In some embodiments, the lock management system can enable the user to set up a recurring schedule wherein remote unlock is enabled periodically, for example, for regularly scheduled service people to gain entrance to the space.

After a period of time passes, at block 5002, the lock management system can enter the process when the lock management system detects the presence of a user at the door. In some embodiments, the lock management system can detect the presence of a user at the door through a proximity sensor installed in or near or on the lock management system. In some embodiments, the lock management system can enable the network connectivity radio to check for remote unlock commands when a user is detected via the proximity detector. In some embodiments, any number of proximity sensors can be used with the lock management system some of which include but are not limited to cameras, acoustic/ultrasonic, laser or UWB time-of-flight, passive IR, RF, microwave, capacitive or inductive sensors, or other sensors that can detect the presence of a user. In some embodiments, a user presence is detected by the lock management system monitoring the door latch for motion, such that a user may wiggle or touch or turn the handle to power on the network connectivity radio. In some embodiments, the lock system comprises a button or touch sensitive surface or the like on the lock system and/or door handle that the user would press and/or touch to initiate the process at block 5002. In some embodiments, the detection of the user wakes up the lock SoC.

At block 5003, the lock SoC can wait for a predetermined time interval in case the user has an entry token that can open the door without the WAN radio. In some embodiments, the entry token can be an NFC tag, RFID card, a credential sent over Bluetooth and/or other short-range radio, a physical door key, a pin code entered on a keypad and/or any other valid access control credential. In some embodiments, if an entry token is presented, this remote unlock process can be canceled because the remote unlock process is no longer needed to unlock the door. This saves power by not turning on the network connectivity radio unnecessarily when a user is able to unlock the door with other, lower power consuming methods.

At block 5004, the WAN radio can be powered on and at block 5005 a user proximity can be reported to the cloud backend server via the WAN radio.

At block 5006, the authorizing user can be notified that there is someone present at the door. In some embodiments, this notification could be in the form of an alert via an application, a text message, an automated phone call or any other form of communication. In some embodiments, if the authorizing user chooses to allow access, the user can confirm the unlock request. At block 5007, this confirmation can be sent by the user via a computing device to the cloud backend. In some embodiments, the blocks 5006 and/or 5007 can provide the authorizing user an additional security step to confirm that the unlock setting is still intended to be in use.

At block 5008 and 5009, the lock management system can allow the cloud backend to determine whether the lock can be opened remotely in response to the request/inquiry, and in some embodiments, the lock management system can report back to the lock management system whether the lock system can unlock or not.

At block 5010, if remote unlock has been granted, the SoC can activate the lock release, and the user is able to open the door. In some embodiments, a light and/or sound could be used on the smart lock to indicate to the user that the door is now unlocked and accessible. In some embodiments, the lock management system can allow the lock to be left in the unlocked position for a predetermined time interval that is long enough for the user to open the door with or without an additional margin period. In some embodiments, if the door is not opened by the user after a predetermined time interval, the lock system can automatically lock so it is not left in the open position.

At blocks 5011 and 5012, the lock management system can notify or alert the user by lights and/or sounds that the door was successfully unlocked.

At blocks 5013 and 5014, in the case that no unlock command was sent from the cloud server, the lock can display a light and/or sound to indicate to the user that access was not granted. In some embodiments, the lock would remain in the locked state in the situation where no unlock comment was received from the cloud server.

At block 5015, the SoC can power off the network connectivity radio in order to go back into a power-saving sleep mode.

In some embodiments, the lock management system can power off the WAN radio until a user proximity sensor is activated in the presence of a user at or near the lock system. In some embodiments, the WAN radio is needed for any remote unlocking. In some embodiments, the WAN radio uses a substantial amount of power.

In some embodiments, the lock management system can save power by waiting a pre-determined amount of time to see if a user is detected by the proximity sensor. In some embodiments, a user cannot gain entry without firing up the network connectivity radio.

In some embodiments, the lock management system can monitor other door unlock methods such as NFC, BLE, or manual key to determine if another method is being used to open the door, in which case the lock management system may not power on the WAN radio.

In some embodiments, the lock management system can use a BLE fast connect hardware and/or method. In some embodiments, if a user wants to open a lock while still some distance away (for example, while in an Uber or the like), the lock management system can open as soon as the BLE connection was made instead of having to wait for the NFC security challenge.

In some embodiments, the lock management system can disable the proximity sensor and related method such that only a user with the correct BLE credentials can signal to the lock system to unlock the door.

In some embodiments, this approach may have a trade-off of system responsiveness vs. battery life. The more frequently the radio is powered on, the lower the battery life. Conversely, if the radio is powered on infrequently, guests may have to wait a period of time, and in some embodiments a significant amount of time, at a door before the lock system unlocks.

In some embodiments, the lock management system may power on the radio when a user or guest is present at or near the door controlled by the lock management system. In some embodiments, the lock system comprises a proximity sensor or the like to detect the presence of a user at or near the lock, the lock management system can immediately or substantially immediately respond to door unlock commands sent through an Internet connection. In this way little or no power is used by the radio except when needed, and the delay while waiting for the unlock commands to come through may be minimized.

In some embodiments, the lock management system can wake-up, turn on the radio, and connect with the main server to determine whether the authorized user has scheduled or authorized a remote unlock.

In some embodiments, to conserve battery power and to reduce latency for lock systems with a remote unlock capability, the lock management systems disclosed herein can power on the radio when a user or guest is present at a door, and then immediately respond to door unlock commands from the Internet. In this way little or no power is used by the radio except when needed, and/or delay while waiting for the unlock commands to come through is minimized.

In some embodiments, to conserve battery power, the lock management system can power on the WAN radio when a user or guest is present at a door, and after the lock management system has checked for a BLE or NFC connection. In this way no power is used by the radio when a user intends to unlock the door using BLE or NFC. In some embodiments, this results in a power savings of 40%, 45%, 50%, 55%, 60%, 65%, 70%, 75%, 80%, 85%, 90%, 95%, or the like.

In some embodiments, the lock management system can power off the WAN radio until a user proximity sensor is activated in the presence of a user at or near the lock system. In some embodiments, the WAN radio is needed for any remote unlocking. In some embodiments, the WAN radio uses a substantial amount of power as compared to other components of the lock management system.

In some embodiments, the lock management system can save power by waiting a pre-determined amount of time to see if a user is detected by the proximity sensor. In some embodiments, a user cannot gain entry without firing up the network connectivity radio.

In some embodiments, the lock management system can monitor other door unlock methods such as NFC, BLE, or manual key to determine if another method is being used to open the door, in which case the lock management system may not power on the WAN radio.

In some embodiments, the lock management system can use a BLE fast connect hardware and/or method. In some embodiments, if a user wants to open a lock while still some distance away (for example, while in an Uber or the like), the lock management system can open as soon as the BLE connection was made instead of having to wait for the NFC security challenge.

In some embodiments, the lock management system can disable the proximity sensor and related method such that only a user with the correct BLE credentials can be able to signal to the lock management system to unlock the door.

8.0 Local Door Open And Close Sequences

In some embodiments, the lock management system can enable a method to quickly establish communication with the lock system from a computing device application or other application that allows a user to unlock and enter a door as quickly as possible while enabling the lock system to draw as little power as possible when not in use.

In some embodiments, the lock management system can implement a fast unlocking response feature. Further, the lock management system can enable a feature to allow users to open doors using computing devices or other computing device without the use of additional entry key cards or fobs or the like.

In some embodiments, the lock management system can enable a computing device to become the access token for the lock system. In some embodiments, the lock management system is configured such that the computing device is enabled to be identified as a specific or a uniquely identifiable computing device securely. In some embodiments, the lock management system can confirm that the computing device is in close physical proximity to or at a specific lock system. In some embodiments, the lock management system can use an NFC tag in the lock management system as one way to satisfy the requirements of uniquely identifying a computing device (e.g., smartphone) and/or determining the proximity of a computing device relative to the lock system. Many modern computing devices are equipped with NFC reader support. NFC reader support in some computing devices only allows one-way communication, allowing the computing device to read tags, but not allowing the computing device to present a tag or send data. In some embodiments, the systems disclosed herein are configured such that the computing device reads tags and does not present tags or send data via NFC.

In some embodiments, the lock management system comprises a smart lock implementation which embeds a simple, read-only NFC tag in the lock, which the lock management system uses as identification. In some embodiments the lock management system can expose an encrypted security challenge along with the NFC tag that only authorized computing devices can decrypt. In some embodiments, the lock management system enables the computing device to read the tag and decrypt the challenge. In some embodiments, the computing device cannot further communicate with the lock management system, as the read-only NFC tag communications channel is one-way from the lock management system to the computing device.

In some embodiments, the lock management system can use a separate Bluetooth Low Energy (BLE) radio system to enable two-way communications between the lock management system and the computing device. In some embodiments, BLE may be difficult to secure since BLE can be longer range and third parties can eavesdrop on the communications. In some embodiments, the NFC and BLE connections work in tandem to allow the user to unlock the door. In some embodiments, after the computing device has received the encrypted NFC tag, the computing device can secure the BLE channel as well. In some embodiments, the computing device application can issue a door unlock command to the smart lock so the user can open the door.

In some embodiments, an NFC token is stored on the computing device so that a user can unlock the lock management system without any cellular service or connection to the Internet.

In some embodiments, the computing device is not a trusted device. In some embodiments, the NFC token stored on the computing device is pre-encrypted in the cloud. In some embodiments, this enables the user to unlock with door without cellular service or connection to the internet and still does not expose the encryption keys to the computing device application.

In some embodiments, if the computing device is authorized to access multiple lock systems in an area or in multiple areas, the NFC tag in the lock is also a way to identify which lock system the user intends to open. In some embodiments, the computing device can be connected to multiple locks in an area or in multiple areas, and the user scanning the NFC tag in a lock indicates the user's intention to open that specific lock.

In some embodiments, for example, if a user is standing in a hallway with multiple lock systems that the user has access to, for instance, a superintendent in an apartment building, by scanning the NFC card the user communicates to the software which BLE connection to connect to and which lock system to unlock.

In some embodiments, the lock management system can enable fast door unlocking. In some embodiments, the user is ideally able to walk up to a door, swipe it with a computing device, as if it were an entry card, and immediately be able to enter the door with little or no delay.

In some embodiments, some time is spent during the NFC reading process, and scanning for the BLE device and setting up a BLE connection can take an extended period of time. For example, if the BLE device in the smart lock is in a low power mode where it only occasionally advertises its presence and accepts connections. Further, a smart lock BLE radio may advertise every 5-10 seconds at which point additional time may be needed to set up a connection. This may lead to an undesirable user experience.

In some embodiments, the lock management system can speed up the BLE connection process by increasing the frequency of the BLE advertisements. In some embodiments, increasing the frequency of BLE advertisements can have a negative impact on the smart lock's battery life, and/or may still cause a lag of several seconds in door unlock timing, all depending on the frequency of the BLE advertisements.

In some embodiments, the lock management system can maintain an audit log of events like lock and/or unlock, and/or door open/close in order to enable an access investigation by the user. In some embodiments, the lock management system can keep the log in a cloud database, which can increase the convenient to access and/or research the access data. In some embodiments, the lock management system can logs all or a portion of the events to the cloud database using its WAN radio connection. In some embodiments, the lock management system can store only certain log data in the cloud database to avoid using the lock radio in order to conserve battery life of the lock system.

In some embodiments, the lock management system can send a message to the computing device communicating that the door was closed. In some embodiments, the computing device can send a message back to the lock management system confirming the receipt of the door close message. In some embodiments this maintains the audit log of door events.

In some embodiments the lock management system can communicate the audit log of events with the computing device through BLE connection. In some embodiments this can result in power savings because the WAN radio is not turned on.

In some embodiments, the lock management system can the WAN radio to communicate door events to the main server.

In some embodiments, the lock management system can reduce the amount of WAN radio usage by the lock system by enabling the computing device to store in the cloud database the audit log data of lock events. In some embodiments, the lock can log events via its WAN radio when it cannot confirm from the computing device application that an event has been successfully logged in the cloud database by the application. For example, a door closing event might happen after the computing device that was used to open the door has gone out of BLE range and dropped its connection to the lock management system.

In some embodiments, the lock management system can power on the WAN radio when the user moves out of the BLE range of the lock management system before an event can be communicated to the management application. In some embodiments, this results in power savings by reducing the amount of time the WAN radio is powered on and in use, while still ensuring a complete audit of events is recorded. In some embodiments this can result in a power savings of 40%, 45%, 50%, 55%, 60%, 65%, 70%, 75%, 80%, 85%, 90%, 95%, or the like. In some embodiments, for example, when the user unlocks the door and immediately rushes to another part of the house to answer a call, set down groceries, or use the restroom, the computing device may not receive the message from the lock management system that the door was closed. In some embodiments, the management application can notify the user when it did not receive a door close confirmation message from the lock management system. In some embodiments, the lock management system can turn on the WAN radio and communicate a record of the door event to the main server to maintain the audit log.

In some embodiments, the lock management system can reduce or eliminate the time spent by the computing device scanning for and/or connecting to the lock management system.

In some embodiments, the computing device may be kept in a state where the computing device is periodically scanning for locks that it is authorized to open.

In some embodiments, the lock management system is configured such that when the user approaches a lock system that the user is authorized to open, and comes within range of the BLE radio signal, the computing device can speculatively make a connection to the smart lock BLE, before the user reaches the door, thereby reducing the amount of time to unlock the door due to the overhead of setting up a BLE connection between the lock management system and the computing device. In some embodiments, at this point, the computing device cannot open the door because the computing device has not yet received the NFC challenge (e.g., an encrypted output of an NFC card).

In some embodiments, the speculative BLE connection improves the speed at which the smart lock unlocks by 5%, 10%, 15%, 20%, 25%, 30%, 35%, 40%, 45%, 50%, 55%, 60%, or the like.

In some embodiments, the lock management system is configured such that after the user swipes the door with the computing device, and reads/decrypts the NFC challenge, the computing device uses the already-open BLE connection to immediately command the smart lock to open the door.

9.0 Walk-Up Unlock Embodiments

In some embodiments, the lock management system can implement hardware and a method to unlock a smart lock as an authorized user approaches it, without having to connect to a cloud authentication service server and/or where the smart lock is in a deep power-saving state.

In some embodiments, there are times when it is convenient for a smart lock user to pre-enable the lock system to open automatically for the user as the user approaches the lock system. For example, if the user knows that the user's hands will be full with packages, groceries, children, etc., when approaching the door, then the lock management system can pre-enable the lock system to open automatically for user as the user approaches the lock system.

In some embodiments, the user can choose whether to authorize the lock management system to only unlock the door, or to authorize the lock management system to unlock and unlatch. For example, if the user knows that the user's hands will be full when approaching the door, the lock management system can pre-enable the lock system to unlock and unlatch, enabling easier entry.

In some embodiments, for security, the lock management system can enable this walk-up unlock mode for occasional use, and/or only for a specific time windows and/or only for specific users and/or only for specific lock systems and/or only for specific locations.

In some embodiments, authentication for lock access may be done at a cloud and/or Internet server, and in some embodiments, it may be preferred to limit communications between the lock management system and the computing device. In some embodiments, instead of having the lock management system communicate directly with the cloud server, and in order to reduce the amount of power used by a battery-powered lock management system by not requiring the lock management system to power on LTE, WiFi, and/or other power-intensive radio systems, the lock management system can pre-enable the lock system to open automatically for the user as the user approaches the lock system.

In some embodiments, the creation of the unlock security token by the web backend server, rather than the by the user's phone, increases security.

In some embodiments, the user may choose to enable automatic unlock at all times so that whenever the user approaches the door it automatically unlocks. In some embodiments, this may create an issue in which the lock could be inadvertently unlocked when the user's device is within range of the lock.

In some embodiments, this automatic unlocking mode can be disabled until the user leaves a predetermined geofence or other boundary.

In some embodiments, after a user opens the smart lock door and the door closes, the lock management system cannot easily determine if the user is on the inside or the outside of the door. In some embodiments, if the user is on the outside of the door, as if the user is leaving the home, the smart lock can lock the door. In some embodiments, if the user is on the inside of the door, the door can be latched but left unlocked. In some embodiments, the lock management system can determine if the user is within the home such that power consumption of the smart lock is reduced. For example, the BLE system may not pair with the computing device if the user is within the home as this would cause unnecessary battery drain on the lock management system.

In some embodiments, a time difference of arrival ("TDoA") or RSSI scheme may not be sufficient to determine where the user is, as this may provide the proximity of the user to the door, but not which side of the user is located on.

In some embodiments, a directional BLE antenna or antenna array can be used to determine user location data. In some embodiments, the movement of the user can be monitored in order to predict an intention to unlock the door. In some embodiments directional UWB antennas are used to determine user location data. In some embodiments, the BLE/UWB antennas may be placed on each side of the door or within the door (mortise).

In some embodiments the BLE/UWB antennas are directional in nature and are designed to maximize front-back ratio and minimize side lobes. In some embodiments the antenna type can be patch, PIFA, helical or printed trace. In some embodiments, a particular antenna design, implementation, and type are determined to achieve a particular front-back ratio and side lobe levels for accurate location determination. In some embodiments the ground plane design may have features to further reduce back lobes and side lobes of each antenna radiation pattern.

In some embodiments the lock management system enables BLE and/or UWB radios to communicate with the computing device. In some embodiments the lock management system uses an RSSI reading or raw I/Q data of each antenna path and an algorithm to determine which side of the door the user is on. In some embodiments, the computing device may include an accelerometer and may provide additional data points to capture the speed and direction of the user. In some embodiments the algorithm can determine user location probability and what outcomes shall be taken, (e.g., unpair BLE computing device, lock/unlock door, etc.).

In some embodiments, the location determination may be done after the door closes to ensure a reliable, accurate determination of the location of the user while the user is still close to the door. In some embodiments, the probability of an accurate location determination diminishes rapidly with each second after the door closes due to the high reflection environment and side lobes of each antenna within the lock management system. In some embodiments, therefore, the MCU and BLE/UWB radios are sequenced appropriately to minimize power consumption and maximize locating reliability.

In some embodiments, when the primary smart lock device cannot determine the intent to unlock, other smart locks with BLE/UWB antennas may capture the user's RSSI and TDoA data to determine the user's location in the building, hallways, or other area's in rage of any smart locks. This can include smart locks at the gate of the property, parking garage, building entrances, elevator, or other points of access in the property. This can also provide potential wayfinding and navigation mechanisms, tools and related mapping.

In some embodiments, the user location, speed, and direction data captured by all smart locks in the property, can map the user's path throughout the property. The path of a user can include going to the gym, picking up a package, going out of the building, coming into the building, or other routes to and from locations within the property.

In some embodiments, after the lock management system has captured multiple paths and routes for users in that property, an algorithm can determine or predict the user's probability of intended route. In some embodiments, the lock management system predicts the user's intended route and the outcomes that can be taken. This can include the locking and unlocking of a door, calling the elevator when the user enters the building, or opening the gate when a user intends to exit the building.

In some embodiments, the lock management system can pre-authorize a computing device and/or a computing device application for walk-up unlock access so that when the user approaches the lock system, the lock system unlocks for the user. In some embodiments, this feature is enabled within a controlled time window.

Figure 14:
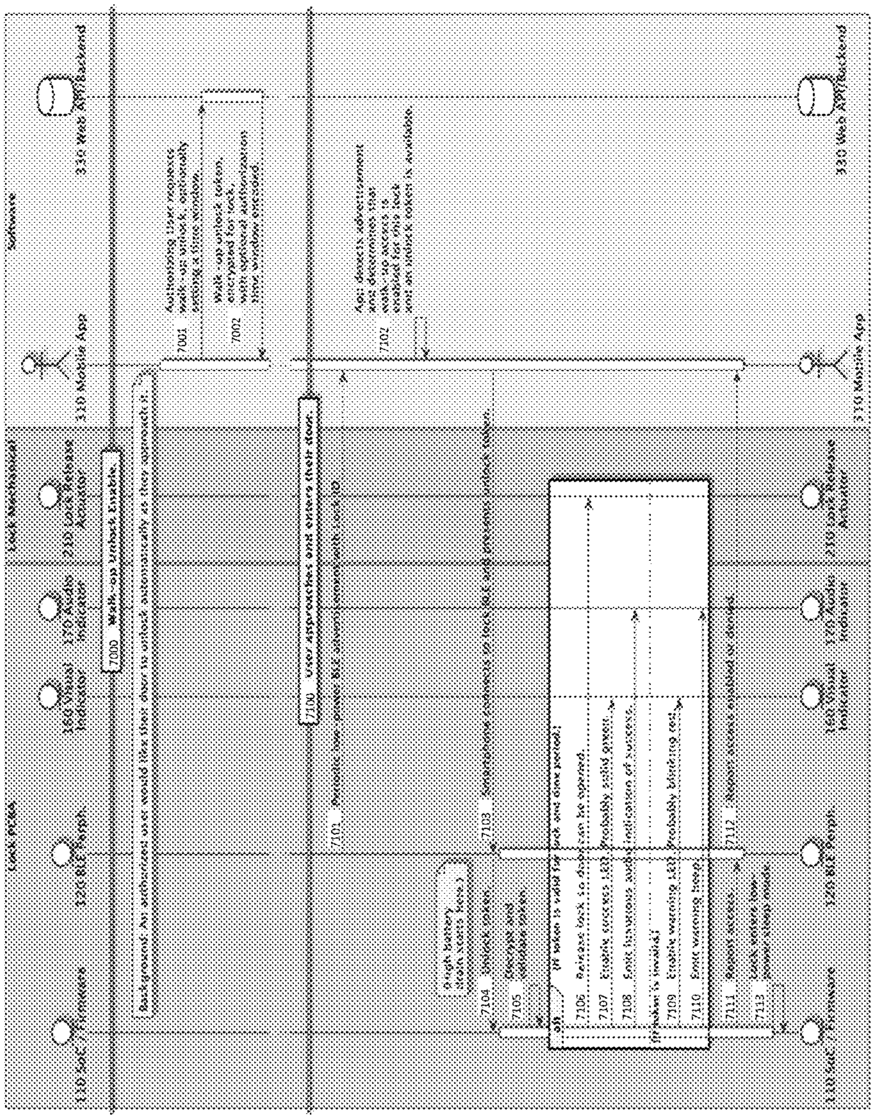
FIG. 14 illustrates an example flowchart of a method for enabling a walk-up unlock feature according to some embodiments herein.

FIG. 14 illustrates an example flowchart of a method for enabling the walk-up unlock feature without requiring the smart lock to power on radio to access the cloud server.

At block 7001 a user who is authorized to open a door can log into a management application and enable the door to automatically unlock when a particular computing device is within range of the lock system. In some embodiments, the user may configure the unlock event to happen a certain number of times (for example, only once) and may assign a time window during which remote unlock is enabled (for example, next 30 minutes) or may assign a specific lock system and/or building that this feature is enabled. In some embodiments, the user may also set up a recurring schedule where remote unlock is enabled periodically (e.g., for regularly scheduled service people to gain entrance to the space).

At block 7002, an automatic unlock security token can be stored to the user's phone, from the web backend server. In some embodiments, the token can be used by the phone to unlock the door, without requiring any user input.

In some embodiments, the lock management system's BLE radio periodically transmits advertisements that include the lock management system's ID. In some embodiments, at block 7101, as a user approaches the door, the user's phone can receive the BLE advertisement.

At block 7102, the computing device application on the user's phone can use the lock ID received in the BLE advertisement to determine that the computing device has a stored token to automatically unlock the door from which it received the advertisement.

At blocks 7103 and 7104, the computing device application can connect to the lock management system via BLE connection and the computing device can transmit the unlock token to the lock management system's SoC via the BLE connection.

At block 7105, the lock management system c decrypt and validate the unlock token.

In some embodiments, if the lock management system validates the token at block 7105 and it is confirmed to be a valid token to unlock the door automatically, the lock management system's SoC can perform the actions at block 7106, 7107 and 7108. At blocks 7106, power can be sent to the lock actuator to unlock the door. At blocks 7107 and 7108, the user can be alerted via lights and/or sounds, that the door has successfully been unlocked. Any number of lights and/or sounds could be implemented.

In some embodiments, if the lock does not validate the token at block 71005, the lock management system SoC can perform actions at blocks 7109 and 7110 in which the user is alerted via lights and/or sounds that the unlock was unsuccessful.

At blocks 7111 and 7112, the lock system can report the status to the application on the computing device via a BLE connection. In some embodiments, the status can include any information about the unlock process, such as recording that the door was opened, closed, how long it was left open, which user unlocked the door, etc. In some embodiments, the status update has reached the computing device, which can be stored in the computing device and/or sent to the cloud database system using the phone's WAN radio.

At block 7113, the lock system can return to the low power sleep mode to conclude the process. In some embodiments, the low power sleep mode enables the BLE radio to continue to advertise for the next unlocking request process.

In some embodiments, the walk up auto unlock feature setting can be left on. In some embodiments, the enabling of this feature to be left on introduces an issue in which the lock system could be inadvertently unlocked simply because the computing device is still in range of the lock, while the user is at the location. This issue could be solved in several ways. In some embodiments, the automatic unlocking mode can be shut off until the user leaves a predetermined geofence or other boundary, which indicates that the user has left the area and is now returning.

In some embodiments, the multiple locks in a building can be used to determine the movement of the user and therefore predict the user's intention to unlock the door. For example, if there is a first lock system at the entry to a building or in a building elevator and a second lock at the entry to an apartment, the user activating the first lock could trigger the automatic unlocking feature of the second lock. If the user has not interacted with the first lock, the lock management system can assume that the user did not leave the building and therefore does not intend to open the second lock although the user may still be within BLE range of the first lock and/or the second lock.

In some embodiments, the lock management system can allow a smart lock to open when an authorized phone enters BLE range. In some embodiments, the user can activate this feature for a predetermined amount of time or for a predetermined number of unlocks.

10.0 Lock Assembly Embodiments

In some embodiments, the lock mechanism is an ANSI grade 1 mortise lockset with an electrified locking mechanism. For example, a locking bar. In some embodiments, the handle hub on the exterior side of the lockset can be fixed from rotating by a locking mechanism. In some embodiments, the locking mechanism can be driven to the unlocked position by a motor or a solenoid that is integral to the lock housing, allowing the user to turn the exterior handle and open the door. In some embodiments, the interior handle hub may be free, allowing the user to open the door freely by turning the interior handle. In some embodiments, the lock housing can include several sensors that monitor the position of components within the lock mechanism, such as a latch position sensor or a bolt position sensor. In some embodiments, the lock can also include a door position sensor which monitors if the door is in the opened or closed position.

In some embodiments, the lock PCBA is an assembly of electronic components that are used to control and monitor the lock and to communicate with external software. In some embodiments the primary component of the lock PCBA can be a SoC (e.g., a microprocessor that hosts the firmware and real time operating system ("RTOS"). In some embodiments the firmware on the SoC is used to control all or a portion of the aspects of the lock and other electronics components on the PCBA. In some embodiments, the PCBA can include several radios for communication with outside devices, including but not limited to a BLE radio, WIFI radio or LTE radio. In some embodiments these radios can be complete or partial radio modules, or radios made up of components including chips and antennas. In some embodiments, the SoC and one or several radios can be included in a single module. In some embodiments BLE radios can be used for communication with computing devices or with gateways that can connect to a wide area network (WAN). In some embodiments WAN radios such as WIFI or LTE can facilitate a connection to a cloud server backend. In some embodiments, the lock PCBA can have an ethernet connection. The ethernet connection can include a hard-wired connection to an internet modem. This connection may provide the lock PCBA an internet connection (e.g., a stable internet connection) that does not rely on any wireless communications.

In some embodiments the PCBA can also include an NFC tag and/or an NFC reader. In some embodiments an NFC tag is a passive tag that can transmit information out to a reading device but cannot read from outside devices. In some embodiments an NFC tag can be used to send a unique lock identification to a computing device when the computing device is brought within close range of the NFC tag. In some embodiments NFC readers allow for two-way communication. In some embodiments the NFC readers would allow the lock to receive a credential from a user via NFC from an NFC tag in a card or fob or from a computing device. In some embodiments, the PCBA can include devices for direct communication to a user, such as LEDs or other light sources, and noise makers such as piezo buzzers or speakers. In some embodiments the indicators can be used to send visual or audible cues or alerts to users.

In some embodiments the access control device may be battery powered. In other embodiments, the device may be powered by building electricity. In some embodiments the lock PCBA can include power management hardware to control the electrical current to the SoC and other electronics components. In some embodiments, the access control device can be powered by ethernet.

In some embodiments, the PCBA can include a proximity sensor. The proximity sensor can be used to detect the presence of a user. In some embodiments, the proximity sensor can use IR, ultrasonic or capacitive technology, or any other appropriate method for detecting the presence of a user at the door. In some embodiments, this sensor can be used to turn on parts of the lock system from a power saving mode or to trigger functions within the lock electronics.

In some embodiments the lock may include a keypad that is connected to the SoC. In some embodiments, users can enter a pin code into the keypad to unlock and gain access to the door. In some embodiments, users can generate new pin codes for other users such as guests or other service people. In some embodiments, pin codes can be set to expire after a pre-determined time interval. In some embodiments, the keypad may be backlit. In some embodiments, the lock (or a separate system) can provide a light directed at the keypad so the keys are illuminated. The keypad can include mechanical keys, piezo, capacitive touch or any other touch sensing technology. The keypad can be implemented in a number of materials including metal, plastic, glass, or any other material. The keypad can implement a shield or film that keeps people from seeing what is being entered on the keypad. The keypad can be waterproof or dust proof. In some embodiments, the keypad can be a separate device that communicates to the main device. The keypad can communicate to the main device via wireless radio communication or can be wired to the main device. In the case of a separate keypad, the keypad can be installed on a door, an adjacent wall, or any other area, or the keypad can be a freestanding device (e.g., the keypad can be moved around like a remote control). Further, the keypad may have different key markings (e.g., letters, numbers, custom symbols, etc.) or can be un-marked.

The keypad can include any number of keys (12 keys, 4 keys, a full alphabet keypad, or any other number of keys or configuration of keys). The keys can be oriented in a decorative pattern. Keys can be made in different shapes such as circles, squares, rectangles, or any other shape. In some embodiments a keypad controller can be used to implement keypad functionality.

In some embodiments, users can control the lock management system and/or the lock system with an application that is run on an external device. For example, the application may be a web application or a mobile application. In some embodiments the application includes an interface that allows users to control the lock and to view lock status. In some embodiments an application on a computing device can communicate with the lock using the computing device's built-in radios to send data to the radios on the lock PCBA. In some embodiments if the computing device is out of range for a direct communication to the lock, or if the application is a web application, the application can communicate to the lock device via a web backend and the WAN radio in the lock or external gateway.

In some embodiments, the lock system can include one or more access control devices (e.g., the lock system may include a multitude of access control devices installed on different doors or other access points). The access control devices can be in a single dwelling or multi-unit building or spread over several buildings with a multitude of access points such as residences, offices, shared common rooms with amenities (e.g., buildings, garage entrances, elevators, etc.). In some embodiments, the application can enable a user to view statuses, receive alerts or manipulate settings for multiple access control devices within the lock system through a single user interface, facilitating streamlined interaction with a large number of devices.

In some embodiments, users may be given several options for credentials for unlocking an access control device. For example, the options can include NFC cards or fobs that are read by the device's integral NFC reader, a physical key, a computing device or other device, a computing device application or a web application, etc. In some embodiments, a computing device application can communicate the credentials to the access control device in several ways. For example, a computing device that is within range (e.g., Bluetooth range) is considered to be local to the access control device and may send credentials to the access control device via BLE. Further, a computing device that is outside of BLE range is considered to be remote and can send credentials to the access control device via the web backend. In some embodiments, when the computing device is considered to be remote, credentials may be sent from the web backend to the lock electronics via a WAN communication such as LTE, UWB, or WIFI, depending on the how the devices were set-up and provisioned.

In some embodiments, the access control device firmware can verify a credential that is presented to it, and if the credential is verified, the firmware can send a signal to the lock mechanism (actuator) to unlock the mechanism. In some embodiments, a log entry is created and recorded on the web backend at some or all phases of this process. In some embodiments, these log entries can show the user activity related to the lock including attempts to unlock, confirmed or denied attempts, doors opening, doors closing and current statuses of the doors and locks. In some embodiments, depending on user's individual software settings and authorizations, a user can be sent alerts or view history logs for individual doors or a multitude of doors in one system. In some embodiments, door and lock usage data can be used to generate business intelligence reports for building managers about building usage. In some embodiments, for example, managers could see the popularity of specific amenities or identify high traffic days and times at specific access points that may necessitate additional staff or services. In some embodiments, data can be used for building security enhancement and coordinated with video surveillance footage.

In some embodiments, the software can allow integration with other third-party systems, software or hardware related to other residence services including maintenance requests, notification of deliveries or packages, as well as other real estate and dwelling management services, by incorporating an application programming interface (API).

In some embodiments, the system can be integrated with third-party services that may require access to the building. For example, packages, food, laundry delivery, dog walking, grocery delivery services, or any services requiring delivery or picking up goods to and from the building. Third-party delivery services may be provisioned to access the building via an authorized key card, fob, pin code, an access token to be used by a mobile device with BLE, NFC, UWB, or any other access credential.

In some embodiments, deliveries of goods can be received by a building manager user. A building manager user may enter the package delivery details into the lock management system through multiple one or means including manual entry of package details into an application (e.g., a website) via a computing device (e.g., a tablet, a mobile phone, any other device with a barcode scanner or camera function) to scan a package barcode or other identification which can automatically populate the data into the lock management system. In some embodiments, the application or computing device can utilize a camera that can use Optical Character Recognition ("OCR") and/or Optical Character Verification ("OCV") or other techniques to transcribe the shipping label and record the data into the lock management system to reduce the risk of human manual entry errors. The same operations may be used by building manager users for packages that are awaiting pick-up by a third-party service.

In some embodiments, the lock management system can match the corresponding resident user or residential unit including apartments, townhouses, or house, to the recipient of the package through identification components of the package label, or through string-matching algorithms or other processes. A notification via email, SMS, or app, may be sent (e.g., automatically sent) to the package recipient, other household member, or other building management users, alerting the intended recipient of the package being delivered. The notification may include details such as time of delivery, sender, name of person or building management user who received or accepted the package from the third-party service, or who processed the package into the lock management system, address of building, location of package storage, instructions to receive the package, access code or credential for the package storage area, room or locker, and more.

In some embodiments, the building manager user may request the package recipient via the app or website for access to the recipient's entry door for their residential unit to deliver the goods to the residence itself. The package recipient may approve or deny the request via the app, website, or other communication means. In the case where the building management user was approved for entry into a package recipient's residence, the building management user may record that the goods were dropped off, and a notification may be sent to the recipient, other household member, or other building manager users.

In some embodiments, the integration with third-party service providers may also include a two-way API integration. For example, the third-party service providers can initiate the request to access the building when delivering the goods, picking up the goods, or updating the status of delivery or pickup. Further, the two-way API integration may be utilized if there are no building manager users or residents available. When requesting access, third-party service providers can provide additional details such as service category, specifications for goods to be delivered or picked up, and/or resident and residential unit details. In some embodiments, the building manger users can update a status and notify the resident, other household member, or other building manager users when a package is picked-up by a third-party.

In some embodiments, the integration can allow the lock management system to request and pull data from third-party systems including property management systems and building management systems. Additional third-party systems may include systems relating to sensors, devices, beacons, environmental monitoring and reporting, energy and utilities consumption, and include AI related data systems. Data may include user properties, unit properties, building properties, analytics, usage patterns, and more. When a new user is added to the third-party system, the data may be used to grant access to that user based on additional lease or move-in/move-out data. When a user's detail is updated in the third-party system, access may be updated accordingly. For example, if a user's lease end date is updated, the access end date will be updated accordingly.

In some embodiments, when a new unit or door is added to the third-party system, a unit or door record can be created in the lock management system.

In some embodiments, when a work order is scheduled in the third-party system, the data may be used to grant staff users or service providers access to the work order location.

In some embodiments, the lock management system may send maintenance or work order related data to the third-party system. Data may include maintenance request details, service or issue category, work order schedule, or work order status. The third-party system may update the records based on the provided data.

In some embodiments, a user can be provisioned with permissions to add or modify user access credentials. For example, a building manager can send credentials to new building residents or revoke credentials from residents that are moving out. The building manager may use an application on a computing device or computer to modify settings for other users and access control devices. In some embodiments, a building manager may set more detailed access polices such as allowing access to particular locations at only specific days or times, or granting a onetime access token. In some embodiments, some users, such as building residents, can be granted limited permissions for modifying access credentials, such as the ability to send access credentials to guests or family members. Further, access can be granted to service providers such as maintenance staff or housekeepers. In some embodiments, there are opportunities to activate or add another authentication mode including inputting an additional credential or code into a physical keypad or keypad on a computing device. In some embodiments, other alternative or additional means of presenting credentials might include biometric identification including face, iris, or fingerprints, voice recognition, or other means of identity authentication.

In some embodiments the lock management system can coordinate with other entry related security systems including video and still camera systems, doorbell systems, and voice or intercom systems for an entryway (e.g., one entryway, multiple entryways, or common entryways), an elevator, parking (e.g., a parking deck, a parking garage, etc.), or a garage system.

In some embodiments, the lock management system can use an application programming interface (API) to provide advance service to residents and building managers. For example, a building manager can streamline data entry and access provisioning by importing resident information from existing software such as building management software. In some embodiment an API can automatically grant access to a guest or service provider for a visit that was scheduled in a different application.

In some embodiments, instead of or in addition to including a lock mechanism, the PCBA and related hardware can connect to an external lock mechanism. In some embodiments, the PCBA can send a voltage to the external lock mechanism which can trigger the mechanism to unlock. Various types of locks can be used in this configuration, which may give an installer or specifier one or more options to select a lock that coordinates with the type of door they are using. For example, the external lock mechanism can be an electrified mortise lock, electrified strike, electro-magnetic locking mechanism, or any other electrified lock that can release when a signal is received from the PCBA and related hardware. In some embodiments, the PCBA can send a voltage (e.g., an industry standard voltage such as 12V or 24V). Therefore, one or more standard locks may be used.

In some embodiments, the PCBA can send a signal to an external door controller or access control device which can send the signal to unlock a door. In some installations, the installer or specifier may maintain an existing door controller or access control device to avoid rewiring or reconfiguring existing systems. In some embodiments, the PCBA can communicate with the external door controller or access control device with a protocol (e.g., a standard protocol). For example, the protocol may be Wiegand or RS-485 or any other protocol that can be interpreted by the external door controller or access control device.

In some embodiments, the external door controller or access control device can receive an access code. The lock PCBA can send an access code that the door controller or access control device may recognize. In some embodiments, the PCBA can store a single access code that is recognized by the door controller or access control device, which it uses as an output when access is granted. When the PCBA verifies a valid access credential, the PCBA can send the output access code to the door controller or access control device. The door controller or access control device can verify the output access code and send a signal to unlock the lock mechanism.

In some embodiments the hardware can be installed on a door. In some embodiments the hardware can be installed on the inside or outside of the door. In some embodiments, the hardware can be installed inside the door thickness. In some embodiments, components of the hardware can be installed in a combination of inside, outside or within the door and can be connected to each other via wires going through the door, or can communicate with each other wirelessly.

In some embodiments, the hardware can be installed on an adjacent wall, instead of or in addition to being installed on the door. This may allow for compatibility with doors that do not take a typical hardware installation, such as glass doors, sliding doors or doors with unique architectural details. This can give an installer or specifier flexibility for coordinating hardware selection to coordinate with specific door types.

In some embodiments, electrical components, such as radio antennas, NFC readers or other components can be hidden inside the door or wall. The components being hidden may reduce visible surface mounted components or make the device more discrete because parts of the device or its components may be hidden in the wall. This can create space between the antennas and a metal product housing which may increase the antenna signal strength.

In some embodiments, the lock management system may be a decentralized system including multiple networked computers. In some embodiments, the lock management system may be implemented using virtual compute resources. For example, the lock management system may be implemented on a virtual machine. Further, all or a portion of the lock management system may be stored and/or may store data in a distributed ledger (e.g., a blockchain network). When access is granted by the lock management system, the access credential (e.g., an access control token) and information identifying the validity of the access credential may be encrypted and may be split into multiple files. The access credential and associated information may be sent as a single transaction (e.g., a pair) to a first node of the distributed system or as multiple transactions. The access credential and associated information may be stored as blocks of a blockchain network.

In some embodiments, the access control activity logs may be stored in the blockchain network to protect manipulation of logged data. The activity logs may be stored as blocks in the blockchain network. For example, the lock management system may log entries via a door, lock actuation, provided credentials, etc. The lock management system can store each log as a separate block in the blockchain network. Further, the lock management system can maintain immutability for the logs based on storing each log as a block. The lock management system may provide access to the blockchain network to multiple users associated with a lock, a door, a building, etc. For example, multiple families associated with apartments in an apartment building may be provided access to a blockchain network including blocks associated with activity logs for a lock for the apartment building.

11.0 Business Intelligence Data

In some embodiments, users can access aggregated logged data. For example, in some embodiments, residents, tenants, owners, managers, building boards, and developers can receive access control data detailing entry, access, and interaction with the lock management system. Further, dormitories, the hospitality industry, and other commercial buildings may also utilize aggregated logged data. The data may include traffic patterns, occupancy tracking for common rooms and for buildings as a whole, identification of specific events, staffing levels tied to usage levels, contact tracing, and time of entry or movement to monitor staff attendance or punctuality. In addition, in some embodiments, historical and audit data is retrievable (e.g., in the case of staff, tenant, or owner incidents).

In some embodiments, reports are generated based on the data. For example, the lock management system (or a separate system) can generate inactive user reports and incidence daily summary reports for designated door events. In some embodiments, there is integration with or collection of third-party data. For example, the third parties can include other property management software and other resident systems such as maintenance, parking, deliveries and package pick-up, thermostats, and leaks. In some embodiments, data is collected about mail, package, and food delivery services and other service providers. Further, identification or other building features are also integrated and collected including elevator access management, video, photo, and facial, fingerprint, iris, or other biometrics.

The lock management system may provide, using the data, building management, building co-op and condo boards, HOAs, building developers, apartment owners, etc. with custom and standard data reports, metrics, KPIs, predictive analytics, benchmarking, etc. to market data to manage a building's operations, finances and expenses, facilities management, leasing activities, capital planning, etc. (e.g., optimize a building's performance within a portfolio of buildings). Such data may include AI-related features and components.

The data can be organized by apartment unit, by floors, by tower or other customized grouping or category within a building, or across multiple buildings included in a building manager, owner, or developer's portfolio.

In some embodiments, users can access aggregated and specific logged data via an application of a computing device (e.g., a mobile device, a tablet, or other device) to view user data and/or data reports. For example, residents, tenants, owners of apartments, houses, or other residence types, building managers, building co-op or condo boards, HOAs, building owners, and developers can receive access control data detailing entry, access, and interaction with the lock system, as well as other property management data relating to maintenance and work orders, package delivery and pickup, and leasing, sales or purchase related data.

In some embodiments, management companies can receive access control data detailing entry, access and interaction with the lock system, and other property management data relating to maintenance and work orders, package deliveries and pickups, and leasing and sales related data for single family rental homes, vacation properties, planned community townhouses, and other residential and hospitality properties that may be grouped together for management purposes.

In some embodiments, dormitories, the hospitality industry, senior living residential properties, and/or other commercial buildings may utilize aggregated and/or logged access control data and other property management data relating to maintenance and work orders, package deliveries and pickups, as well as leasing and sales related data.

In some embodiments, the business intelligence data may include elevator access and entries, garage and parking space related data and/or data relating to other common and main lobby areas.

In some embodiments, the business intelligence data may include building traffic patterns, occupancy tracking for common rooms and for buildings as a whole, identification of specific events including staff, tenant, or owner incidents, door or access control events, staffing levels tied to usage levels, contact tracing, and time of entry or movement to monitor staff attendance or punctuality.

In some embodiments, business intelligence data can include maintenance and work order activities including maintenance and workflow status, response and completion time for work orders and requests, vendor management including costs, vendor work order response and completion time, and vendor service performance.

In some embodiments, business intelligence data can include data relating to mail and package delivery, mail and package pickup, food and groceries delivery, and other service providers.

In some embodiments, business intelligence data can include data relating to leasing or sales activities including self-guided prospective tenant apartment tours, broker visits to available apartments or residences, frequency of access to available apartments or residences, change of access credentials upon lease termination or lease renewals, apartment, house or other residence vacancy data, leasing or sales conversion data, and correlations of access control data to leasing or sales activities.

In some embodiments, business intelligence data may correlate to rent and revenue benchmarks, building profitability, net operating income, costs and expenses related to operations and facilities management.

In some embodiments, building intelligence data may integrate with third party data from other property management software and other resident or building systems relating to parking, HVAC, thermostats, lighting, security video and cameras, leaks and other sensors, and energy consumption.

In some embodiments individual identification data may also be integrated and collected including video, photo, and facial, fingerprint, iris, or other biometrics.

In some embodiments, the lock management system may retrieve historical and audit business intelligence data collected and archived for reports and/or analyses.

12.0 Two-Way Communication Platform

The lock management system may implement a two-way communication platform between building management, building staff, resident, and other parties including leasing and sales representatives. The lock management system may provide, via the two-way communication platform notifications, messages (e.g., SMS text messages, Email-In-app messages, pop-up messages, voice messages (via smart home hubs)). The lock management system may also provide messages via online or web portals for residents, building management and staff, residents owners, and/or resident tenants.

The lock management system may provide, via the communication platform, requests and status relating to access management and control issues including resident access, guest access, contractor/vendor access, door status and activity, access scheduling and/or permissions.

The lock management system may provide, via the communication platform, requests and status relating to maintenance and work orders, showing status, vendors, schedules, calendar, and access needs.

The lock management system may enable, via the communication platform, booking and scheduling amenities such as services, classes, events, and common rooms (e.g., gym, roof terrace, conference rooms, private dining rooms), etc. at the building In some embodiments, the communications can be organized using any filter. For example, the communication may be filtered based on apartment, floor, tower, building, location, custom recipient groups (e.g., pet owners), renters vs. owners, etc.

The lock management system may provide, via the communication platform, communications relating to leasing matters, rent payments, HOA or other association payments, and/or other business or financial matters between building management and a resident.

The lock management system may, via the communication platform, alert building management (e.g., a front desk) regarding permission-to-enter details, guests, vacation notices, realtor instructions, etc. For example, the lock management system, may, via the communication platform, provide picture of an environment (e.g., an apartment) to a prospective tenant.

The lock management system may provide, via the communication platform, status, alerts and notifications relating to package delivery, package pickup, food and grocery deliveries.

The lock management system may provide, via the communication platform, status, alerts and notifications for building management relating to energy usage and conservation, including leak sensors, door and window sensors, HVAC, lighting, cable, and other building devices, meters, and services The lock management system may provide, via the communication platform, information identifying building notifications and announcements of scheduled maintenance, repairs, inspections, etc. for the entire building, certain locations of the building (e.g., floors, tower, wing), etc.

The lock management system may provide, via the communication platform, a status to building management and/or residents indicating if messages are read, opened, seen, etc.

All or a portion of the communications via the communication platform may be stored and/or archived in a cloud server and accessible by residents, building management and/or staff.

Building management and staff may, via the communication platform, interact with the lock management system for scheduling and prioritization of work orders, recurring maintenance and scheduled maintenance, regular or spot-check inspections, etc.

The lock management system may provide, via the communication platform, information identifying leasing related issues between building management, leasing representatives, current residents or owners, and prospective residents and/or owners. For example the leasing related issues may include scheduling unescorted, self-guided showings for prospective residents, scheduling of broker showings, processing lease applications, tracking of virtual showings, providing renter's or owner's insurance, etc.

13.0 Leasing Activities

In some embodiments, building manager users can add apartment or residence details to an associated door and/or lock. For example, the details can include door names, unit size, unit type (1BR, 2BR, townhouse, house, etc.), leasing price, selling price, occupancy status, unit images, videos, 3D renderings, blueprint, floor plans, mark as staged, leasing terms and duration, etc. All or a portion of fields of the details may be automatically populated by the lock management system. For example, if the apartment or residence has no resident assigned with user access to a door, the system can update the occupancy status to 'Not Occupied.'

In some embodiments, the lock management system can be integrated with apartment/home listing applications or other websites via an API. The integration may enable apartment details to be visible to prospective tenants/owners and be updated via the lock management system.

In some embodiments, prospective residents, tenants, owners, etc. can view the apartment or other residence details, including a three-dimensional rendering which may act as a virtual tour for the residence.

In some embodiments, the building manager user, in-house broker, third-party broker, etc. can calendarize the prospective resident, tenant, or owner visit or onboarding process. For example, the building management user or broker may, via the lock management system, set a time and/or date for open houses, apartment visits, self-guided tours, in-person tours, appointments, or other activities in the form of an event or task.

In some embodiments, to schedule tours, open houses, and/or apartment visits, the lock management system may (e.g., automatically) create and authorize door access for the prospective residents, tenants, or owners. The prospective residents, tenants, or owners may enter the building, apartment or residence using the mobile app or other access credentials. The building management user may be notified, via the lock management system, that the prospective residents, tenants, or owners have entered the building or residence. In some embodiments, one or more communications may take place between the prospective tenants/owners and the building management user via the mobile app, email, chat or other communication channels.

In some embodiments, the building manager user can add, view, edit, manage, etc. leasing data in the lock management system. For example, the building management user may access viewing data, prospective resident, tenant or owner screening data or profiles, conversion rate from visit to leasing, broker involvement, performance, and broker profile and data including broker fees, number of tours whether self-guided, virtual or broker escorted, response time from visit to lease conversion, and/or any other leasing related data.

In some embodiments, the building manager user can manage a prospective resident, tenant or owner leasing, sale or purchase documentation, approval process, and onboarding process via the lock management system. The lock management system can manage lease or sale/purchase templates that can be auto populated by user inputs, integration with third-party background checks, credit checks, and/or other financial information. The building manager user, resident, tenant and/or owner may be able to review and execute lease, sale, or purchase documentation via the lock management system. The lock management system can (e.g., automatically) set door access based on lease data. Further, the lock management system can utilize the lease data to trigger notifications to alert residents, tenants and/or owners to due dates of rent, common charges, maintenance payments, HOA payments, move-in and move-out dates, and/or other activities. The lock management system can compile lease data aggregation reports or business intelligence reports that can inform building manager users about business metrics for the status (e.g., financial status) of the building or building portfolio.

In some embodiments, the building manager user can compile resident experience data (e.g., through surveys conducted via the computing device). Building manager users may provide surveys for the resident to complete. Surveys can collect data about a range of apartment related activities including move-in/move-out experience, or other resident experience related surveys for maintenance, leasing or other activities.

In some embodiments, the building manager user can create and/or manage tasks in the system for resident move-in or move-out. The tasks may be individual tasks or grouped to form a set of sub-tasks for projects such as building manager users preparing the residence prior to resident move-in or preparing the residence at move-out. The tasks may relate to maintenance, access codes and permissions, leasing activities, and/or other activities. All or a portion of the move-in or move-out activities may be communicated to residents via the computing device including move-in or move-out checklists, photos or videos relating to move-in or move-out, and/or other information.

14.0 Maintenance

In some embodiments, the lock management system can provide, via the platform, data to a computing device relating to one or more of maintenance operations, work order status and work order flow, work order staffing and assignments, archive of maintenance work categorized by criteria including by work type (e.g., electrical, plumbing, among other classifications), by apartment, by specific appliance or device, etc., maintenance vendor information, vendor rating, billing details, integration with building property accounting and payables system, and/or maintenance vendor performance data (e.g., response time, time to completion, and cost).

In some embodiments, the software platform can enable building manager users and/or resident users to make maintenance requests and can include a platform for photos or videos of the maintenance issue or work needed to be uploaded or for building staff photos or videos of ongoing or completed maintenance work to be uploaded.

In some embodiments, building manager users, via the lock management system, may assign the maintenance requests to another building manager user, third-party user, and/or vendor. Building manager users and/or the lock management system may recommend suitable vendors to assign maintenance requests based on maintenance issue category, response time, vendor rating, vendor location, or other data. Building manager users may grant mobile or pin access to vendors or building management users to visit the location to perform the maintenance.

In some embodiments, the lock management system can, via the platform, integrate into other property management software relating to property inspection schedules, calendars, and/or systems.

In some embodiments, the lock management system can provide, via the platform, analytics for building manager users to assess staff productivity, response time to maintenance requests, time to completion of maintenance tasks, etc.

In some embodiments, the lock management system can provide, via the platform, inventory of building management provided equipment and appliances for each or a portion of the apartments (e.g., a microwave, an oven, a dishwasher etc.) along with model or serial number, and any identifying information, as well as purchase or maintenance history.

In some embodiments, the lock management system can provide, via the platform, data across multiple maintenance activities for a building manager or owner's portfolio of buildings, and integrate into other property management software including accounting or other functions.

15.0 Initialization of Components for Lock Actuation

Figure 7:
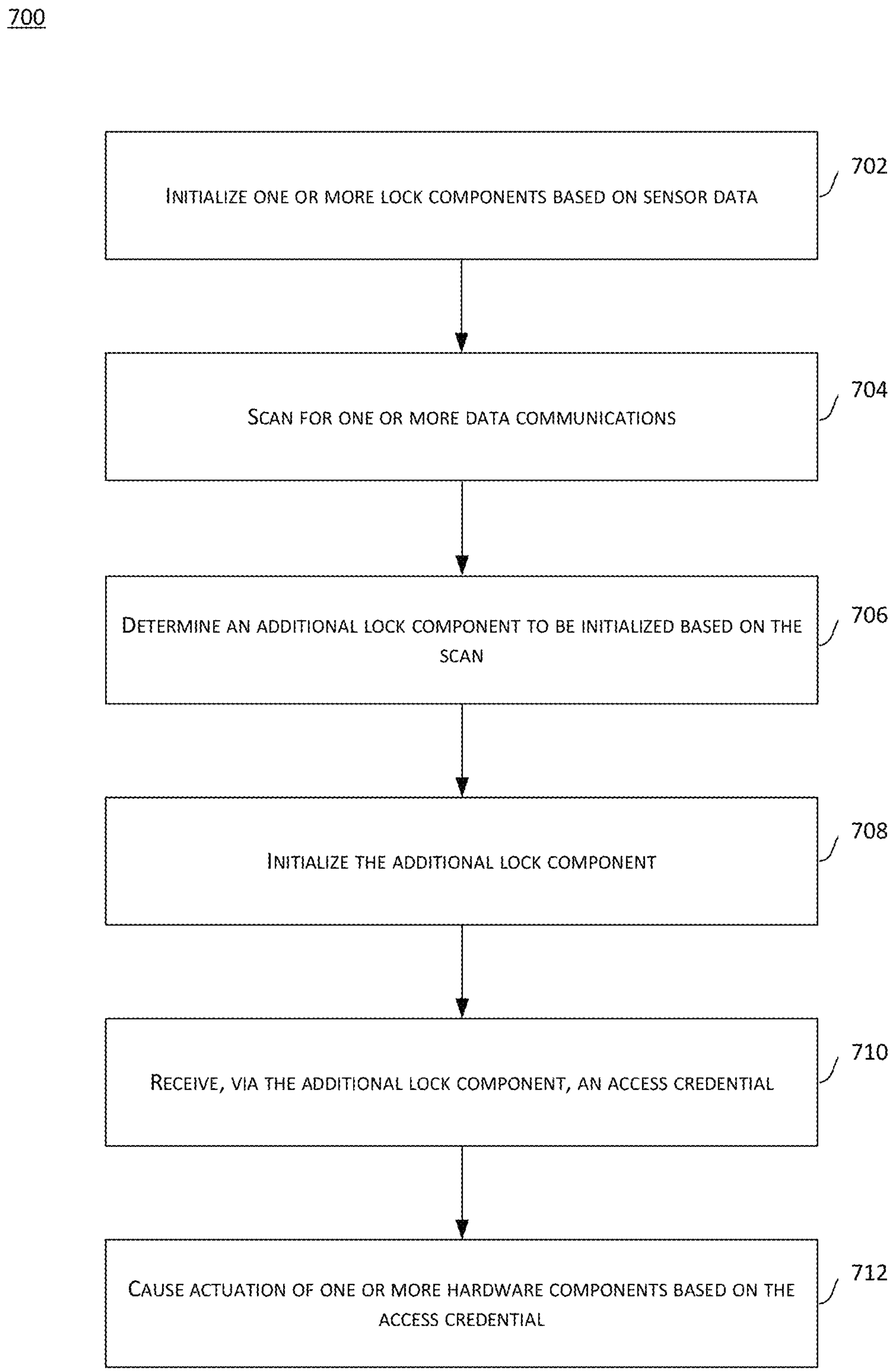
FIG. 7 illustrates a workflow for actuating components of a lock system according to some embodiments herein.

As discussed above, a lock management system may manage the initialization of particular components of the lock management system and/or a lock system to perform lock operations. The lock management system may selectively initialize components based on data communications received from a computing device. By selectively initializing components, the lock management system can reduce the power consumed by the lock management system and/or the lock system. With reference to FIG. 7, an illustrative algorithm or routine 700 will be described for performing operations associated with a lock. The routine 700 may be implemented, for example, by the lock management system 100 described above with reference to FIG. 1. The routine 700 begins at block 702, the lock management system 100 initializes one or more lock components based on sensor data. The one or more lock components may include a SoC component. In some embodiments, prior to initialization, the one or more lock components may be in a reduced power or no power mode as compared to a full power mode. The lock management system 100 can obtain the sensor data via one or more sensors. The one or more sensors may include a proximity sensor, a card reader (e.g., an NFC card reader), a fob reader (e.g., an NFC fob reader), etc. In some embodiments, the sensor data may include at least one of proximity data or motion data. The one or more sensors may be in a full power state or mode. For example, prior to initialization of the one or more lock components and/or an additional lock component, the one or more sensors may be in a full power mode or state. The lock management system 100 may initialize the one or more lock components by providing full power to the one or more lock components. Therefore, the lock management system 100 initializes the one or more lock components.

To determine additional components for initialization, at block 704, the lock management system 100 scans for one or more data communications. The one or more data communications may include data communications via a local network, a personal network, or a short range network. The lock management system 100 can scan for data communications from a device (e.g., for a predetermined period of time). For example, the device may be a user computing device, a tag (e.g., an NFC tag), a card, or a fob. Further, the lock management system 100 may obtain scanning information from a user computing device indicating a time period for scanning for the one or more data communications. Therefore, the lock management system 100 scans for the one or more data communications.

Based on the scan, at block 706, the lock management system 100 determines an additional lock component to be initialized. The lock management system 100 may determine the one or more data communications correspond to communications to be received, processed, etc. by the additional lock component. In some embodiments, the lock management system 100 may determine the additional lock component based on determining one or more data communications corresponding to an initialized lock component were not received during the scan. In other embodiments, the lock management system 100 may determine the one or more data communications correspond to an initialized lock component and may receive an access credential via the initialized lock component for actuation of hardware components. Further, if the lock management system 100 determines the one or more data communications correspond to an initialized lock component, the lock management system 100 may not initialize an additional lock component. Therefore, the lock management system 100 determines the additional lock component to be initialized based on the scan.

To perform the lock operation, at block 708, the lock management system 100 initializes the additional lock component. In some embodiments, prior to initialization, the additional lock component may be in a reduced power or no power mode as compared to a full power mode. The lock management system 100 may initialize the additional lock component by providing full power to the additional lock component. Therefore, the lock management system 100 initializes the additional lock component.

At block 710, the lock management system 100 receives, via the additional lock component, an access credential. In some embodiments, the lock management system 100 can receive the access credential and authenticate and/or verify the access credential is valid (e.g., by parsing the access credential for an identifier and comparing the identifier with a stored list of identifiers). If the lock management system 100 is unable to authenticate and/or verify the access credential, the lock management system 100 may not cause actuation of a hardware component and may cause output of an alert (e.g., audio data and/or image data) to a computing device and/or an indicator. Therefore, the lock management system 100 receives the access credential via the additional lock component.

At block 712, the lock management system 100 causes actuation of one or more hardware components (e.g., to lock or unlock a lock) based on the access credential. The one or more hardware components may include a lock actuator. The lock management system 100 can cause actuation of the one or more hardware components based on authenticating the access credential. In some embodiments, the lock management system 100 can cause output (e.g., via an indicator) of audio data and/or image data based on causing actuation of the one or more hardware components. The lock management system 100 may transmit lock information to a user computing device (and cause display of the lock information via a display of the user computing device) based on causing actuation of the one or more hardware components. The lock information may identify the lock, a status of the lock, activity associated with the lock, entry via a door associated with the lock, etc. Therefore, the lock management system 100 causes actuation of the one or more hardware components.

The lock management system may reset the one or more lock components, the one or more hardware components, and/or the additional lock component. For example, based on causing actuation of the one or more hardware components, the lock management system 100 can maintain the one or more sensors in a full power mode and the one or more lock components, the additional lock component, and/or the one or more hardware components in a low power or no power mode. In some embodiments, the lock management system 100 may deinitialize one or more components. The lock management system 100 may determine a time period has elapsed after actuation of the one or more hardware components (e.g., unlocking a lock and/or opening a door) and may actuate the one or more hardware components based on elapsing of the time period (e.g., to lock the door).

16.0 Computing System

Figure 6:
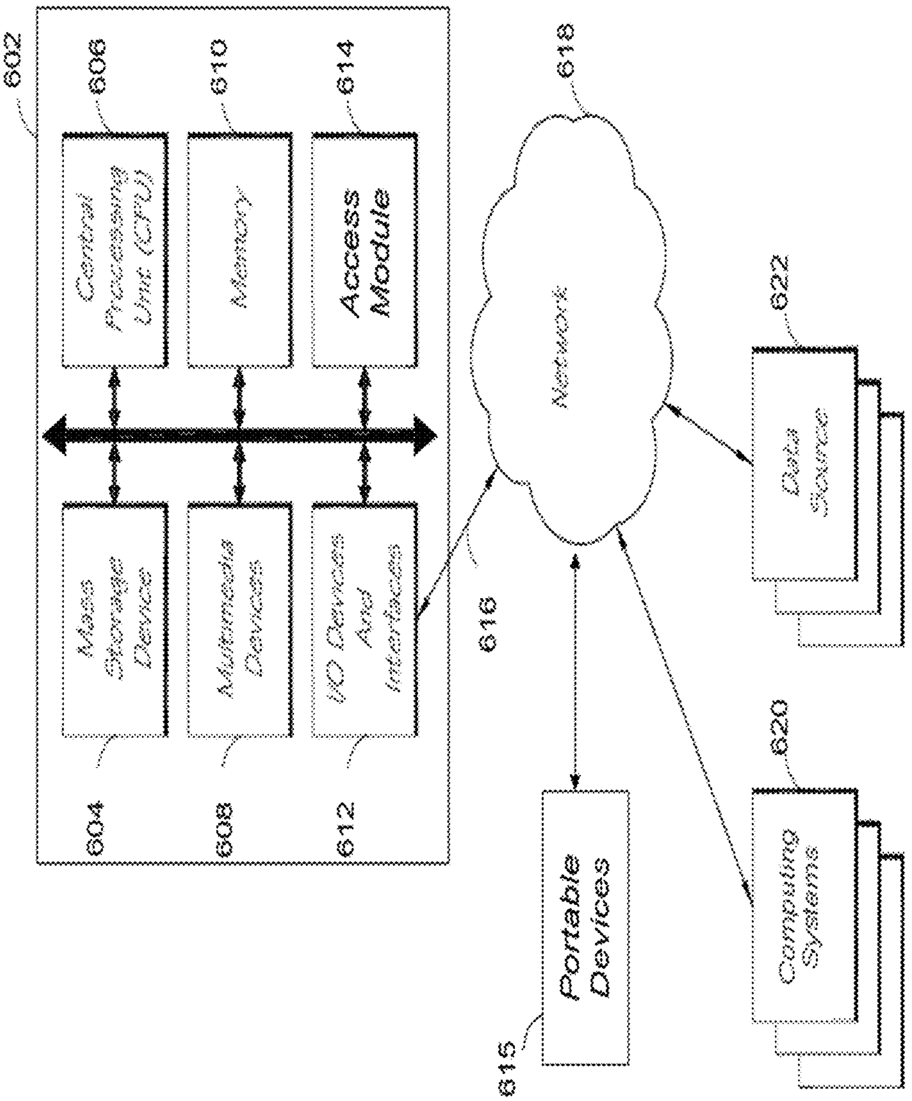
FIG. 6 illustrates an example computing system for performing various operations according to some embodiments herein.

In some embodiments, the systems, processes, and methods described herein are implemented using a computing system, such as the one illustrated in FIG. 6. The example computer system 602 is in communication with one or more computing systems 620 and/or one or more data sources 622 via one or more networks 618. While FIG. 6 illustrates an embodiment of a computing system 602, it is recognized that the functionality provided for in the components and modules of computer system 602 may be combined into fewer components and modules, or further separated into additional components and modules.

The computer system 602 can comprise an access module 614 that carries out the functions, methods, acts, and/or processes described herein. The access module 614 is executed on the computer system 602 by a central processing unit 606 discussed further below.

In general, the word "module," as used herein, refers to logic embodied in hardware or firmware or to a collection of software instructions, having entry and exit points. Modules are written in a program language, such as JAVA, C or C++, PYTHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite the module's physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 602 includes one or more processing units (CPU) 606, which may comprise a microprocessor. The computer system 602 further includes a physical memory 610, such as random access memory (RAM) for temporary storage of information, a read only memory (ROM) for permanent storage of information, and a mass storage device 604, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 602 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 602 includes one or more input/output (I/O) devices and interfaces 612, such as a keyboard, mouse, touch pad, and printer. The I/O devices and interfaces 612 can include one or more display devices, such as a monitor, that allows the visual presentation of data to a user. More particularly, a display device provides for the presentation of GUIs as application software data, and multi-media presentations, for example. The I/O devices and interfaces 612 can also provide a communications interface to various external devices. The computer system 602 may comprise one or more multi-media devices 608, such as speakers, video cards, graphics accelerators, and microphones, for example.

The computer system 602 may run on a variety of computing devices, such as a server, a Windows server, a Structure Query Language server, a Unix Server, a personal computer, a laptop computer, and so forth. In other embodiments, the computer system 602 may run on a cluster computer system, a mainframe computer system and/or other computing system suitable for controlling and/or communicating with large databases, performing high volume transaction processing, and generating reports from large databases. The computing system 602 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 602 illustrated in FIG. 6 is coupled to a network 618, such as a LAN, WAN, or the Internet via a communication link 616 (wired, wireless, or a combination thereof). Network 618 communicates with various computing devices and/or other electronic devices. Network 618 is communicating with one or more computing systems 620 and one or more data sources 622. The access module 614 may access or may be accessed by computing systems 620 and/or data sources 622 through a web-enabled user access point. Connections may be a direct physical connection, a virtual connection, and other connection type. The web-enabled user access point may comprise a browser module that uses text, graphics, audio, video, and other media to present data and to allow interaction with data via the network 618.

Access to the access module 614 of the computer system 602 by computing systems 620 and/or by data sources 622 may be through a web-enabled user access point such as the computing systems' 620 or data source's 622 personal computer, cellular phone, smartphone, laptop, tablet computer, e-reader device, audio player, or other device capable of connecting to the network 618. Such a device may have a browser module that is implemented as a module that uses text, graphics, audio, video, and other media to present data and to allow interaction with data via the network 618.

The output module may be implemented as a combination of an all-points addressable display such as a cathode ray tube (CRT), a liquid crystal display (LCD), a plasma display, or other types and/or combinations of displays. The output module may be implemented to communicate with input devices 612 and also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 602 may comprise a physical or logical connection established between a remote microprocessor and a mainframe host computer for the express purpose of uploading, downloading, or viewing interactive data and databases online in real time. The remote microprocessor may be operated by an entity operating the computer system 602, including the client server systems or the main server system, and/or may be operated by one or more of the data sources 622 and/or one or more of the computing systems 620. In some embodiments, terminal emulation software may be used on the microprocessor for participating in the micro-mainframe link.

In some embodiments, computing systems 620 who are internal to an entity operating the computer system 602 may access the access module 614 internally as an application or process run by the CPU 606.

The computing system 602 may include one or more internal and/or external data sources (for example, data sources 622). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 602 may also access one or more databases 622. The databases 622 may be stored in a database or data repository. The computer system 602 may access the one or more databases 622 through a network 618 or may directly access the database or data repository through I/O devices and interfaces 612. The data repository storing the one or more databases 622 may reside within the computer system 602.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A lock management system for actuating one or more hardware components of a lock system to enable access to a controlled environment, the lock management system comprising:

a memory circuit configured to store computer-executable instructions; and a hardware processor in communication with the memory circuit, wherein execution of the computer-executable instructions by the hardware processor causes the hardware processor to at least:

obtain sensor data via one or more sensors;

initialize, by the processor, one or more lock components of the lock management system based on the sensor data;

scan, by the processor via the one or more lock components, for one or more data communications from a device;

determine, by the processor, via the one or more lock components, one or more additional lock components to be initialized based on scanning for the one or more data communications;

initialize, by the processor, via the one or more lock components, the one or more additional lock components;

receive, by the processor, via the one or more additional lock components, an access credential;

authenticating the access credential;

cause actuation, by the processor, of the one or more hardware components of the lock system based on the access credential;

reset, by the processor, the one or more lock components and the one or more additional lock components;

obtain, by the processor, additional sensor data;

initialize, by the processor, one or more second lock components based on the additional sensor data;

scan, by the processor, for one or more second data communications from a second device;

determine, by the processor, that the one or more second data communications from the second device correspond to an initialized lock component;

receive, by the processor, via the initialized lock component, a second access credential; and cause actuation, by the processor of the lock management system, of the one or more hardware components based on the second access credential.

2. A lock management system for actuating one or more hardware components of a lock system to enable access to a controlled environment, the lock management system comprising:

a memory circuit configured to store computer-executable instructions; and a hardware processor in communication with the memory circuit, wherein execution of the computer-executable instructions by the hardware processor causes the hardware processor to at least:

initialize, by the processor, one or more lock components of the lock management system based on sensor data;

scan, by the processor, via the one or more lock components, for one or more data communications from a device;

determine, by the processor, via the one or more lock components, one or more additional lock components of the lock management system to be initialized based on scanning for the one or more data communications;

initialize, by the processor, via the one or more lock components, the one or more additional lock components;

receive, by the processor, via the one or more additional lock components, an access credential;

cause actuation, by the processor, of the one or more hardware components of the lock system based on the access credential, reset, by the processor, the one or more lock components and the one or more additional lock components;

obtain, by the processor, additional sensor data;

initialize, by the processor, one or more second lock components based on the additional sensor data;

scan, by the processor, for one or more second data communications from a second device;

determine, by the processor, that the one or more data second communications from the second device correspond to a lock component;

receive, by the processor, via the lock component, a second access credential; and determine, by the processor, that the second access credential is not authenticated.

3. The lock management system of claim 1, wherein the one or more hardware components comprises a lock actuator.

4. The lock management system of claim 1, wherein execution of the computer-executable instructions by the hardware processor further causes the hardware processor to at least:

cause output, by the processor, of one or more of audio data or image data based on causing actuation of the one or more hardware components.

5. The lock management system of claim 1, wherein execution of the computer-executable instructions by the hardware processor further causes the hardware processor to at least:

transmit, by the processor, lock information to a user computing device based at least in part on causing actuation of the one or more hardware components, wherein transmitting the lock information comprises causing display of the lock information via a display of the user computing device.

6. The lock management system of claim 1, wherein execution of the computer-executable instructions by the hardware processor further causes the hardware processor to at least:

authenticate, by the processor of the lock management system, the access credential, wherein causing actuation of the one or more hardware components is further based on authenticating the access credential.

7. The lock management system of claim 1, wherein execution of the computer-executable instructions by the hardware processor further causes the hardware processor to at least:

obtain, by the processor, the sensor data from one or more sensors; and maintain, by the processor, the one or more sensors in a full power state and each of the one or more lock components and the one or more additional lock components in a no power or low power state based at least in part on causing actuation with data communications relating to of the one or more hardware components.

8. The lock management system of claim 1, wherein execution of the computer-executable instructions by the hardware processor further causes the hardware processor to at least:

obtain, by the processor, the sensor data from one or more sensors, wherein prior to initializing the one or more lock components and the one or more additional lock components, the one or more sensors are in a full power state and the each of the one or more lock components and the one or more additional lock components is in a no power or low power state.

9. The lock management system of claim 1, wherein initializing the one or more lock components and the one or more additional lock components comprises providing full power or low power to each of the one or more lock components and the one or more additional lock components.

10. The lock management system of claim 1, wherein execution of the computer-executable instructions by the hardware processor further causes the hardware processor to at least obtain, by the processor, the sensor data from one or more sensors.

11. The lock management system of claim 1, wherein execution of the computer-executable instructions by the hardware processor further causes the hardware processor to at least obtain, by the processor, the sensor data from one or more sensors, wherein the one or more sensors comprise at least one of a proximity sensor, a card reader, or a tag reader.

12. The lock management system of claim 1, wherein the one or more lock components comprises a System-on-a-Chip.

13. The lock management system of claim 1, wherein scanning for the one or more data communications comprises scanning for the one or more data communications for a particular period of time.

14. The lock management system of claim 1, wherein execution of the computer-executable instructions by the hardware processor further causes the hardware processor to at least obtain, by the processor, scanning information from a user computing device, wherein the scanning information indicates a period of time for scanning for the one or more data communications, wherein scanning for the one or more data communications comprises scanning for the one or more data communications for the period of time.

15. The lock management system of claim 1, wherein the one or more data communications comprise at least one of a local network communication, wide area network communication, a personal network communication, or a short range network communication.

16. The lock management system of claim 1, wherein execution of the computer-executable instructions by the hardware processor further causes the hardware processor to at least cause, by the processor, a second actuation of the one or more hardware components of the lock system based on a timeout period.

17. The lock management system of claim 1, wherein the one or more data communications comprise an LTE-based or other cellular communication.

18. The lock management system of claim 2, wherein execution of the computer-executable instructions by the hardware processor further causes the hardware processor to at least cause output, by the processor, of one or more of audio data or visual data based on determining that the second access credential is not authenticated.

19. The lock management system of claim 2, wherein the one or more data communications comprise an LTE-based or other cellular communication.

20. The lock management system of claim 2, wherein the one or more hardware components comprises a lock actuator.

* * * * *